United States Patent
Xiu et al.

(10) Patent No.: US 11,790,612 B2
(45) Date of Patent: Oct. 17, 2023

(54) INFORMATION DISPLAY METHOD AND DEVICE, TERMINAL, AND STORAGE MEDIUM

(71) Applicant: Tencent Technology (Shenzhen) Company Limited, Guangdong (CN)

(72) Inventors: Haikun Xiu, Shenzhen (CN); Haifeng Ding, Shenzhen (CN); Yan Zhang, Shenzhen (CN)

(73) Assignee: Tencent Technology (Shenzhen) Company Limited, Guangdong (CN)

(*) Notice: Subject to any disclaimer, the term of this patent is extended or adjusted under 35 U.S.C. 154(b) by 246 days.

(21) Appl. No.: 17/242,760

(22) Filed: Apr. 28, 2021

(65) Prior Publication Data

US 2021/0295604 A1    Sep. 23, 2021

Related U.S. Application Data

(63) Continuation of application No. PCT/CN2020/076931, filed on Feb. 27, 2020.

(30) Foreign Application Priority Data

Mar. 18, 2019  (CN) .................... 201910203491.2

(51) Int. Cl.
*G06T 19/00*    (2011.01)
*H04N 13/117*   (2018.01)
(Continued)

(52) U.S. Cl.
CPC .......... *G06T 19/006* (2013.01); *G06F 16/955* (2019.01); *H04N 13/117* (2018.05); *H04N 13/139* (2018.05)

(58) Field of Classification Search
CPC ... G06T 19/006; G06F 16/955; H04N 13/117; H04N 13/139
See application file for complete search history.

(56) References Cited

U.S. PATENT DOCUMENTS 10,475,250 B1 * 11/2019 Huang ............... G06Q 30/0643
10,685,488 B1 *  6/2020 Kumar .................. A61H 23/04
(Continued)

FOREIGN PATENT DOCUMENTS

CN    102810099 A    12/2012
CN    107730350 A     2/2018
(Continued)

OTHER PUBLICATIONS

Mohammad Azam, "Playing Videos in Augmented Reality Using ARKit", published in HackerNoon.com, on Feb. 19, 2018. https://medium.com/hackernoon/playing-videos-in-augmented-reality-using-arkit-7df3db3795b7 (Year: 2018).*

(Continued)

*Primary Examiner* — Chong Wu
(74) *Attorney, Agent, or Firm* — Crowell & Moring LLP

(57) ABSTRACT

An information display method, including: obtaining target information and an actual image when an information display signal is received, the actual image being an image obtained by photographing a real environment by using a camera; generating an augmented reality (AR) image according to the target information and the actual image; and displaying the AR image in a user interface, an AR element in the AR image being used for displaying the target information. In this application, an AR image is generated according to the obtained target information and actual image, and the AR image is displayed on a user interface, where the AR image includes an AR element configured to display the target information.

19 Claims, 17 Drawing Sheets

(51) Int. Cl.
 H04N 13/139 (2018.01)
 G06F 16/955 (2019.01)

(56) References Cited

U.S. PATENT DOCUMENTS

| | | | | |
|---|---|---|---|---|
| 2012/0086729 | A1* | 4/2012 | Baseley | G06T 19/00 345/633 |
| 2018/0253901 | A1 | 9/2018 | Charlton et al. | |
| 2020/0219323 | A1* | 7/2020 | Varshney | H04L 51/52 |

FOREIGN PATENT DOCUMENTS

| | | |
|---|---|---|
| CN | 108063936 A | 5/2018 |
| CN | 109920065 A | 6/2019 |

OTHER PUBLICATIONS

International Search Report and Written Opinion for priority application No. PCT/CN2020/076931 dated Jun. 2, 2020, 9p, in Chinese language.
English language translation of the International Search Report for priority application No. PCT/CN2020/076931, dated Jun. 2, 2020, 2p.
Concise Explanation of the Relevance for the International Written Opinion of PCT/CN2020/079631, 1p.

* cited by examiner

INFORMATION DISPLAY METHOD AND DEVICE, TERMINAL, AND STORAGE MEDIUM

RELATED APPLICATIONS

This application is a continuation of PCT Application No. PCT/CN2020/076931, entitled "INFORMATION DISPLAY METHOD AND DEVICE, TERMINAL, AND STORAGE MEDIUM" and filed with the China National Intellectual Property Administration on Feb. 27, 2020, which claims priority to Chinese Patent Application No. 201910203491.2, entitled "INFORMATION DISPLAY METHOD AND APPARATUS, DEVICE, AND STORAGE MEDIUM" filed with the China National Intellectual Property Administration on Mar. 18, 2019. The above applications are incorporated herein by reference in their entireties.

TECHNICAL FIELD

This application relates to the field of augmented reality, and in particular, to an information display method and apparatus, a terminal, and a storage medium.

BACKGROUNDS

Content of information includes at least one piece of information of text, a picture, audio, and a video.

In the related art, an information display method includes the following steps: An information application program is installed in a terminal. After a user starts the information application program, the information application program obtains n pieces of information from a server. The information application program displays n control lists arranged from top to bottom on a user interface, and each control list displays summary information of one piece of information. When the user clicks one piece of information, if the information is video information, a player is started to play the information; if the information is image-text information, a browser is started to display the information.

Some problems in a process of using the foregoing technology is found: Display of the display manner are relatively similar, and after the user starts the information application program, information cannot be known quickly and simply, causing the user stays for a relatively short time when using the information application program.

SUMMARY

According to various embodiments of this application, an information display method and apparatus, a terminal, and a storage medium are provided. The technical solutions are as follows:

According to one aspect of the embodiments of the present disclosure, an information display method is provided, performed by a terminal, the method including:
 obtaining target information and an actual image when an information display signal is received, the actual image being an image obtained by photographing a real environment by using a camera;
 generating an augmented reality (AR) image according to the target information and the actual image; and
 displaying the AR image in a user interface, an AR element in the AR image being used for displaying the target information.

According to another aspect of the embodiments of the present disclosure, an information display apparatus is provided, the apparatus including:
 an obtaining module, configured to obtain target information and an actual image when an information display signal is received, the actual image being an image obtained by photographing a real environment by using a camera;
 a generation module, configured to generate an AR image according to the target information and the actual image; and
 a display module, configured to display the AR image in a user interface, an AR element in the AR image being used for displaying the target information.

According to another aspect of the embodiments of the present disclosure, an information display apparatus is provided. The apparatus comprising,
 a user interface, configured to receive an information display signal;
 a camera, configured to capture an actual image by photographing a real environment;
 a image processor, configured to generate an AR image according to a target information and the actual image; and
 a display, configured to display the AR image, an AR element in the AR image being used for displaying the target information.

According to another aspect of the embodiments of the present disclosure, a terminal is provided, including a processor and a memory, the memory storing computer-readable instructions, the computer-readable instructions, when executed by the processor, causing the processor to perform the operations of the information display method.

According to another aspect of the embodiments of the present disclosure, a non-volatile computer-readable storage medium is provided, storing computer-readable instructions, the computer-readable instructions, when executed by one or more processors, causing the one or more processors to perform the operations of the information display method.

According to another aspect of the embodiments of the present disclosure, a computer program product is provided, storing computer-readable instructions, the computer-readable instructions being loaded and executed by a processor to implement the information display method.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

To make the objectives, technical solutions, and advantages of this application clearer, the following further describes implementations of this application in detail with reference to the accompanying drawings.

First, several terms involved in the embodiments of this application are briefly introduced.

Information: information that brings value to user within a short time, the short time refers to a period of time calculated from generation of the information. Exemplarily, a reason that information can bring value to the information itself within a relatively short time lies in that the user obtains and uses the information in time. The information has timeliness and regionality, and the information needs to be consumed and used by the user. Exemplarily, the information at least includes news, and may further include other media such as an expert lecture, an academic paper, music, and an advertisement. A carrying form of the information includes, but is not limited to: at least one of text, a picture, audio, and a video.

Augmented reality (AR): a technology that calculates at least one of a position and an angle of a camera image (an image of a real environment), preferably, in real time in combination with at least one of a corresponding image, a video, a 3D model, and the like (a virtual image). The user may obtain virtual information in a real environment through the AR technology, and the real environment and the virtual information domain complement and overlay with each other, to enhance visual perception of the user.

With the rapid development of the AR technology, a plurality of application programs in the related art introduce new functions based on the AR technology. For example, a picture beautification application program provides combined facial recognition or feature point extraction performed according to preset feature points, to dynamically make an AR mask or an AR scene effect; an application program including a social function makes an AR red envelope special effect in combination with elements such as an envelope; and an electric business application program makes a cool operational activity special effect in combination with operational activities and an AR special effect.

Figure 1:
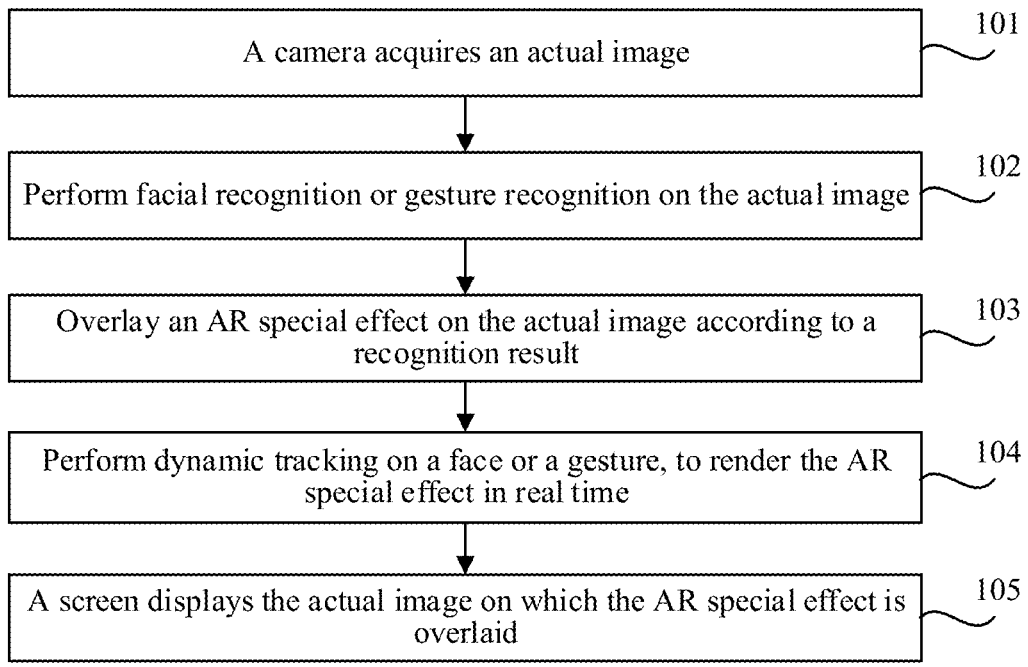
FIG. 1 is a flowchart of a method for displaying an AR special effect according to a related art.

The AR special effects introduced by the application programs based on the AR technology basically follow the flowchart of a method for displaying an AR special effect shown in FIG. 1, and the method includes the following steps:

Step 101. A camera acquires an actual image.

An application program is installed in a terminal. Using the terminal being a touch screen phone as an example, the user starts the application program by clicking an icon of the application program.

After obtaining access to a camera of the terminal, the application program acquires an actual image by using the camera. The actual image is an image obtained by performing real-time acquisition on a real environment according to a position and a direction of the camera. A face or a gesture may exist in the actual image.

Step 102. Perform facial recognition or gesture recognition on the actual image.

The application program performs recognition on the actual image obtained by the camera. For example, when the real-time image is a facial image, the application program performs facial recognition on the facial image, or when the real-time image is a gesture image, the application program performs gesture recognition on the gesture image.

Step 103. Overlay an AR special effect on the actual image according to a recognition result.

The application program obtains a recognition result after performing facial recognition or gesture recognition. The application program overlays an AR special effect on the actual image according to the recognition result. For example, when the recognition result is a facial recognition result, a mask special effect, a car ear special effect, a Peking Opera mask special effect, or a Peking Opera female role special effect is overlaid on a face of the actual image; and when the recognition result is a gesture recognition result, a summon special effect, an animal special effect, or a glass breaking special effect is added to the actual image.

Step 104. Perform dynamic tracking on a face or a gesture, to render the AR special effect in real time.

The actual image may be one image in a video frame sequence in a video. Because the face or the gesture in the actual image moves, the application program determines changes of the face or the gesture in the actual image according to a dynamic tracking algorithm, and adjusts the AR special effect in real time according to the change, to change an effect displayed by the AR special effect in time.

The changes of the face or the gesture in the actual image includes: at least one of a position change and a direction change.

Step 105. A screen displays the actual image on which the AR special effect is overlaid.

The application program displays the generated AR special effect by using a screen of the terminal.

The overlay manner of the AR special effect is mainly applied to a video capture process and a main objective thereof is to provide an entertainment function for the user.

Figure 2:
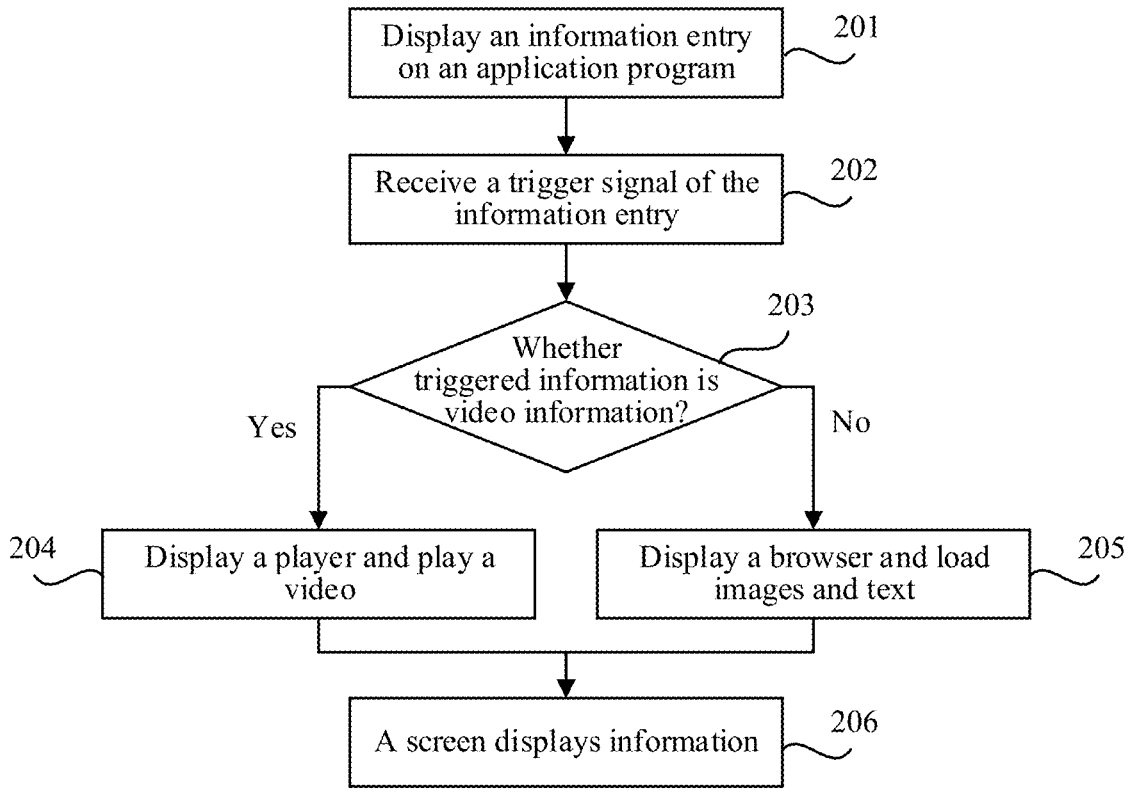
FIG. 2 is a flowchart of an information display manner according to a related art.

On the other hand, the information includes image-text information and video information, and a display method for displaying the information on the terminal in the related art is shown in FIG. 2, and the procedure includes the following steps:

Step 201. Display an information entry on an application program.

An application program is installed in the terminal. The application program provides an information display interface, and an information entry is displayed on the information display interface. Exemplarily, the information display interface includes an information control unit, where the information control unit is an entry control unit configured to obtain information content. Using the information control unit being a control list as an example, the control list includes a plurality of list items, and a function of each list item displays a title and a time of information. When the user clicks the list item, the terminal obtains the information from a server.

Step 202. Receive a trigger signal of the information entry.

When the terminal receives a click signal on the information control unit on the information display interface, the terminal determines that a trigger signal of the information entry is received.

Step 203: Whether triggered information is video information?

After obtaining content of triggered information, the terminal determines whether the trigger information is video information.

If the triggered information is video information, step 204 is performed; and if the triggered information is not video information, step 205 is performed.

Step 204. Display a player and play a video.

When the terminal determines that the triggered information is video information, the terminal displays a player on the information display interface and plays a video.

Step 205. Display a browser and load images and text.

When the terminal determines that the triggered information is not video information, the terminal determines that the clicked information is image-text information, displays a browser on the information display interface, and loads images and text.

Step 206. Display information on a screen.

The terminal displays the information clicked by the user on a screen. Using information being image-text information as an example, as shown in FIG. 3, the information is displayed on the screen of the terminal in a tiled manner.

Figure 3:
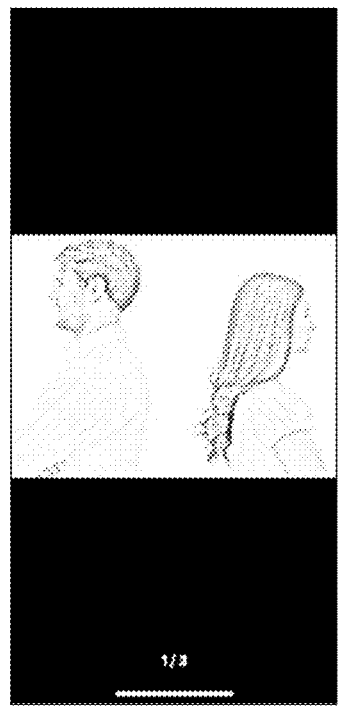
FIG. 3 is a schematic diagram of an image-text information display manner according to a related art.

However, the display manner of information shown in FIG. 3 is merely displaying the information on the screen in a tiled manner, the information display manner is single, and a display effect of animations and special effects in the information content is not ideal. As a result, the user has no strong immersed sense when obtaining the information. After the user opens the application program, the user generally closes the application program while speeding few time on the application program, which wastes storage resources and computing resources on the terminal.

An embodiment of this disclosure provides an information display solution, which enriches the display forms of information by combining the AR technology and the displaying of information, to enhance the immersed sense of the user when obtaining the information.

Figure 4:
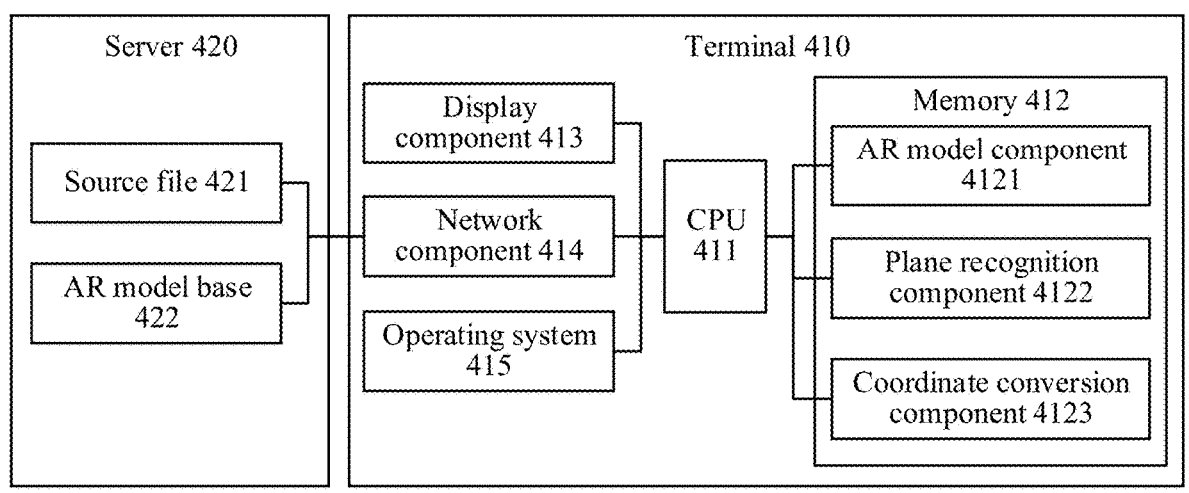
FIG. 4 is a block diagram of a computer system according to an exemplary embodiment of this disclosure.

FIG. 4 shows a system block diagram of a computer system according to an exemplary embodiment of this disclosure, and FIG. 4 includes a terminal 410 and a server 420.

The terminal 410 may be devices such as a smartphone, a tablet computer, AR glasses, or a head-mounted display. Exemplarily, the terminal 410 includes a central processing unit (CPU) 411, a memory 412, a display component 413, a network component 414, and an operating system 415.

The CPU 411 may be a single-core or a multi-core processor and is a core part of the terminal 410, and is configured to perform steps of an information display method in the following embodiment.

The memory 412 is configured to store computer-readable instructions. An application program supporting information display is run in the memory 412. The application program may be an instant messaging program or a social messaging program supporting information display, and the application program may alternatively be a news application program. In an example, the application program includes a plurality of program components, and the memory 412 includes: an AR model component 4121, a plane recognition component 4122, and a coordinate conversion component 4123.

The AR model component 4121 is configured to store an AR model downloaded by the terminal 410. The AR model includes any one model of a television model, a projection screen model, a display window model, a billboard model, a wall model, a bulletin board model, a picture frame model, a desk model, and an art gallery model.

The plane recognition component 4122 is configured to perform recognition on a plane in an actual image obtained by a camera to obtain a plane recognition result, and construct a plane in an AR environment according to the plane recognition result.

The coordinate conversion component 4123 is configured to determine a position of an AR element in the AR environment.

The display component 413 is configured to display AR information generated based on the AR technology, for example, information carried on the AR element.

The network component 414 is configured to obtain a source file 421 of the information from the server 420 and is configured to carry an AR model of the information, and the AR model is stored in an AR model base 422 in the server 420.

The operating system 415 is configured to provide conditions in hardware aspects for implementation of the AR technology. Exemplarily, the operating system 415 uses a system in which an ARKit, a SpriteKit, and a SceneKit are combined. The ARKit is configured to construct an AR environment, the SpriteKit is configured to perform graphics rendering and animation formation in combination with a 2D effect scene and a 3D effect scene, and the SceneKit is configured to perform physics-based rendering in combination with the 2D effect scene and the 3D effect scene.

The server 420 further stores the source file 421 of the information and the AR model base 422, where the source file 421 includes data corresponding to the information, and the AR model base 422 is configured to store various AR models. Exemplarily, the AR model is a three-dimensional model configured to carry and present information.

Figure 5:
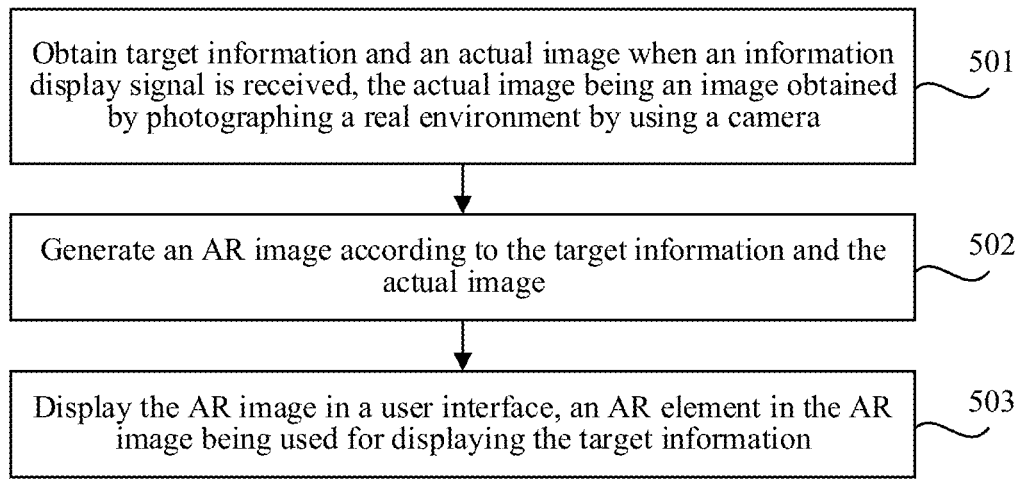
FIG. 5 is a flowchart of an information display method according to an exemplary embodiment of this disclosure.

FIG. 5 is a flowchart of an information display method according to an exemplary embodiment of this disclosure. The method may be performed by the terminal shown in FIG. 4, or the method may be performed by the application program in the terminal shown in FIG. 4, and the method includes:

Step 501. Obtain target information and an actual image when an information display signal is received, the actual image being an image obtained by photographing a real environment by using a camera.

When the terminal is a device having a touch screen (for example, a phone), the information display signal may be a signal generated by the terminal according to a received click event, and the click event is an event that the user performs a click operation on a user interface of the terminal.

When the terminal is AR glasses, the information display signal may be a specified gesture signal, a signal that presses a preset physical button on the AR glasses, or a double-eye stare signal of the user.

Using the terminal being a device having a touch screen as an example, when a click event occurs on the user interface of the terminal, a control unit corresponding to the click event generates an information display signal. When the terminal receives the information display signal, the terminal determines the control unit that generates the information display signal and obtains information corresponding to the control unit. In addition, an actual image is further obtained by using a camera, where the actual image is an image obtained by photographing a real environment by using the camera.

Exemplarily, the terminal receives a source file of the target information sent by a server. Exemplarily, the target information includes video information and/or image-text information.

Step 502. Generate an AR image according to the target information and the actual image.

An AR image is an image configured to display the target information by using the AR technology.

The terminal generates an AR image according to the target information and the actual image that are obtained, where the AR image is a virtual image generated according to the target information and the actual image.

Exemplarily, the terminal extracts information in the source file of the target information, where the information includes at least one of a video, a picture, and text.

Exemplarily, the terminal converts the extracted information into a format applicable to being displayed in the AR environment, and displays the information of which the format has been converted in the actual image in an overlaid manner to generate an AR image. Alternatively, the terminal converts the extracted information into a format applicable to being displayed in the AR environment, adds the information of which the format has been converted to an AR model, and displays the AR model in the actual image in an overlaid manner to generate an AR image.

The AR image is an image on which the target information is displayed in an overlaid manner on the actual image. The AR model is a virtual three-dimensional model configured to form an AR element carrying the target information in the AR environment (or an AR world).

Step 503. Display the AR image in the user interface, an AR element in the AR image being used for displaying the target information.

The terminal displays the generated AR image on the user interface, where the displayed AR image includes an AR element, and the AR element is configured to display the target information.

Exemplarily, the AR element is a carrier displaying the target information, and the AR element is obtained by the AR model carrying the target information. When the target information is video information, the AR element includes an element corresponding to a carrier carrying video playback; when the target information is image-text information, the AR element includes an element corresponding to a carrier carrying image-text display.

Exemplarily, the target information is video information, and the AR element is any one of a television element, a projection screen element, a display window element, and a billboard element. The television element is an element displaying the video information by using a virtual television, the projection screen element is an element displaying the video information by using a virtual projection screen, the display window element is an element displaying the video information by using a virtual display window, and the billboard element is an element displaying the video information by using a virtual billboard.

Exemplarily, the target information is image-text information, and the AR element is any one of a wall element, a bulletin board element, a picture frame element, a desk element, and an art gallery element. The wall element is an element displaying the image-text information by using a virtual wall, the bulletin board element is an element displaying the image-text information by using a virtual bulletin board, the picture frame element is an element displaying the image-text information by using a virtual picture frame, the desk element is an element displaying the image-text information by using a virtual desk, and the art gallery element is an element displaying the image-text information by using a virtual art gallery.

The image-text information may be information in a pure-text form, or may be information in a pure-image form, or may be information in a text-image-mixed form.

Based on the above, according to the method provided in this embodiment of this disclosure, when an information display signal is received, target information and an actual image are obtained to generate an AR image, and the AR image is displayed on a user interface, where the AR image includes an AR element configured to display the target information. The terminal displays the target information in the AR image by using the AR element, to combine the information and the AR technology, which enriches the information display manner. During information display, an immersed sense of the user when reading the information is enhanced, so that the user is more likely obtain the information in an AR manner, which increases the stay time of the user when using the application program.

Figure 6:
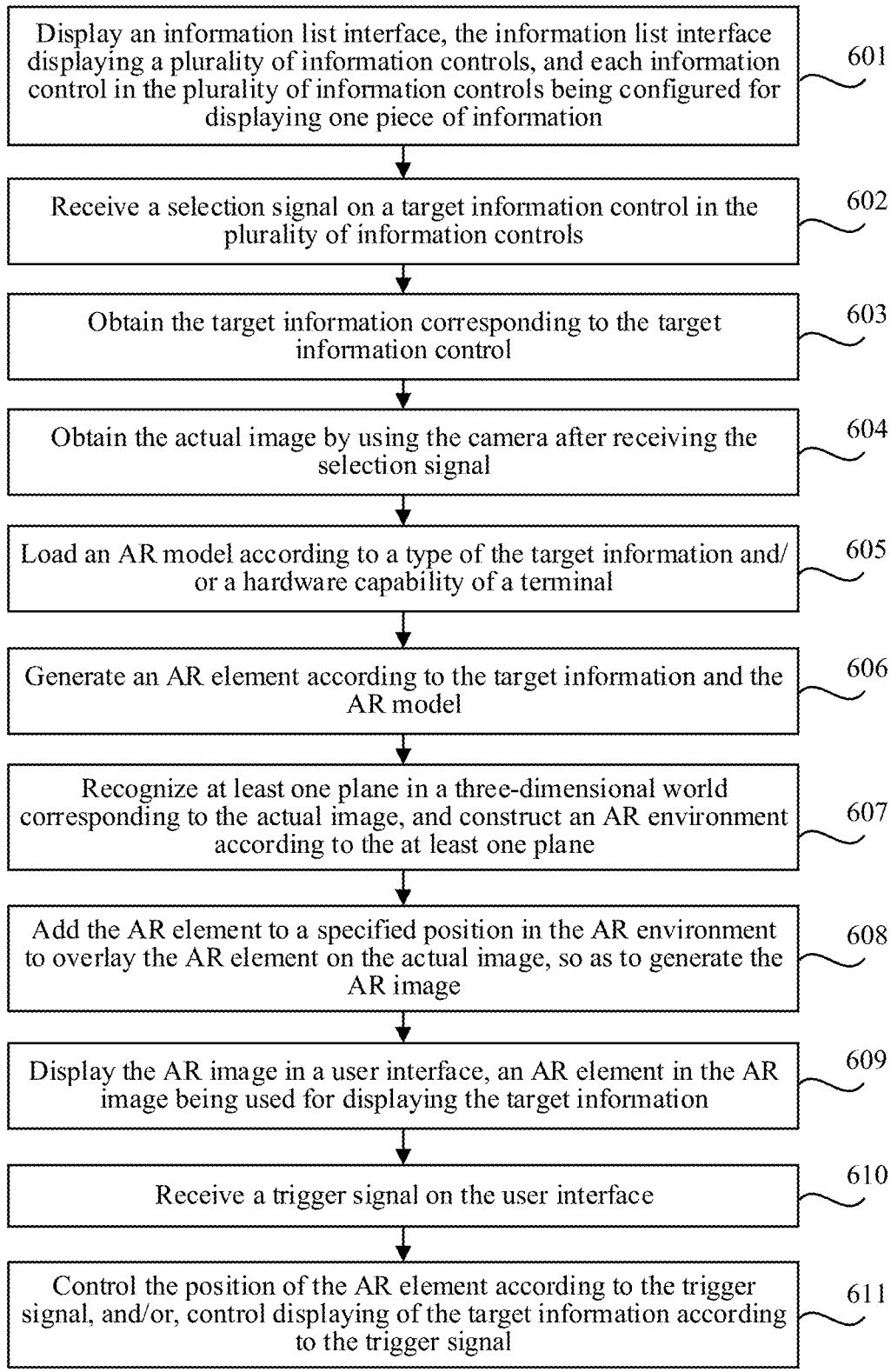
FIG. 6 is a flowchart of an information display method according to another exemplary embodiment of this disclosure.

FIG. 6 is a flowchart of an information display method according to another exemplary embodiment of this disclosure. The method may be performed by the terminal shown in FIG. 4, and the method includes:

Step 601. Display an information list interface, the information list interface displaying a plurality of information control units, and each information control unit in the plurality of information control units being configured for displaying one piece of information.

Figure 7:
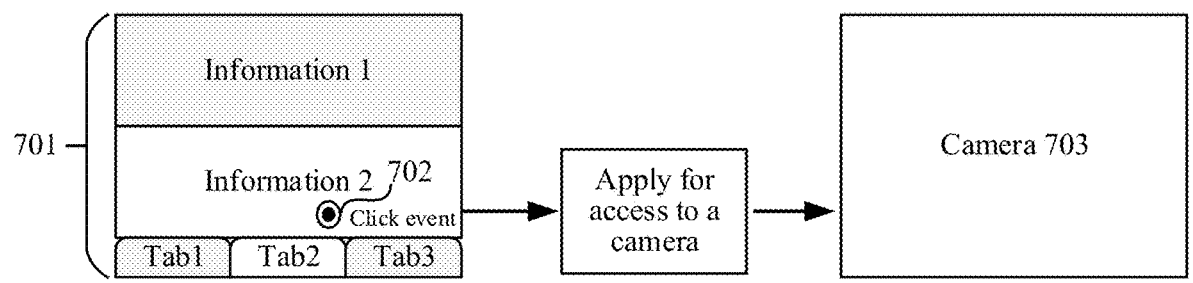
FIG. 7 is a schematic diagram of an information list interface according to another exemplary embodiment of this disclosure.

When the user enters the application displaying information, the user interface of the terminal displays an information list interface, and exemplarily, FIG. 7 shows the information list interface displayed by the terminal. The information list interface 701 displays a plurality of pieces of information from top to bottom. Each information corresponds to one information control unit (description is made by using a control list as an example in FIG. 7), and each information control unit in the plurality of information control units is configured for displaying one piece of information. The information control unit is a control unit configured to obtain information. Each information control unit may display summary message of the information. Information control units can be a device (with or without static or dynamic icons, images, physical buttons, digital buttons, or other displaying measures to display information) that is responsive to a user input. This disclosure provides more details of exemplary components that can be used as control units in the following description.

FIG. 7 exemplarily shows the information list interface including information 1 and information 2, where the information 1 corresponds to one information control unit, and the information 2 corresponds to one information control unit. The number of pieces of information displayed in the information list interface is not limited in this embodiment.

Exemplarily, when the user clicks the information 2, the information control unit is configured to generate an information display signal according to a click event 702, where the click event 702 is an event that the user performs a click operation on the user interface of the terminal. The terminal obtains target information according to the information display signal generated by the information control unit.

Step 602. Receive a selection signal on a target information control unit in the plurality of information control units.

The target information control unit is a control configured to obtain target information. Exemplarily, the target information control unit is an information control unit triggered by the user, and the target information control unit may be any one of the plurality of information control units.

The target information control unit is configured to generate a selection signal according to a click event generated on the target information control unit, where the selection signal is configured to inform an upper layer of the terminal of a triggered state of the target information control unit and instruct the terminal to obtain the target information.

When the target information control unit is triggered, the target information control unit generates a selection signal, and the terminal receives the selection signal on the target information control unit in the plurality of information control units.

Step 603. Obtain target information corresponding to the target information control unit.

The target information is information corresponding to the target information control unit.

The terminal obtains the target information when receiving the selection signal generated by the target information control unit.

Exemplarily, the terminal receives the target information sent by a server when receiving the selection signal generated by the target information control unit.

Step 604. Obtain an actual image by using a camera after receiving the selection signal.

After receiving the selection signal, the terminal determines whether access of the application program displaying information to a camera is permitted. When determining that access of the application program displaying information to the camera is permitted, the terminal enables the camera and obtains an actual image, where the actual image is an image obtained by photographing a real environment by using the camera.

As shown in FIG. 7, when determining that access of the application program displaying information to the camera is not permitted, the terminal receives a request from the application program that receive the displaying information for access to the camera to the terminal. When the terminal agrees with the application, the terminal enables the camera 703 and obtains an actual image; when the terminal does not grant the request, the terminal displays the target information on the user interface in a tiled manner.

Step 605. Load an AR model according to a type of the target information and/or a hardware capability of a terminal.

Exemplarily, the terminal obtains an AR model via the approaches including the following two manners:

First, the terminal stores an AR model base, and the AR model base stores AR models; second, the server stores an AR model base, and the AR model base stores AR models. The terminal obtains an AR model from the server.

Types of the information includes video information and image-text information. The terminal loads a first AR model when a type of the target information is video information, where the first AR model is any one of a television model, a projection screen model, a display window model, and a billboard model. Exemplarily, the first AR model includes a model configured to carry out playback of video information.

The terminal loads a second AR model when the type of the target information is image-text information, where the second AR model is any one of a wall model, a bulletin board model, a picture frame model, a desk model, and an art gallery model. Exemplarily, the second AR model includes a model configured to carry out the display of image-text information.

In an exemplary implementation, using the server storing an AR model base as an example, the terminal sends a hardware capability of the terminal to the server. The hardware capability of the terminal is a capability applicable to an AR model loaded by the terminal, that is, the hardware capability of the terminal refers to the capability of computing resource of for an AR model that the terminal can run. The server receives the hardware capability sent by the terminal and determines an AR model that can be loaded on the terminal according to the hardware capability of the terminal. The server further generates a configuration file corresponding to the terminal. The configuration file is determined by the server according to the hardware capability of the terminal, and the configuration file is used for determining an AR model matching the hardware capability of the terminal. The server sends a third AR model to the terminal according to the configuration file, where the third AR model includes an AR model configured by the server according to the hardware capability of the terminal. The third AR model may be the first AR model or may be the second AR model.

Exemplarily, the manner in which the terminal obtains an AR model includes, but is not limited to the foregoing two manners. The terminal may use at least one of the two manners to obtain an AR model. The manner in which the terminal obtains an AR model is not limited in this embodiment.

Step 606. Generate an AR element according to the target information and the AR model.

When receiving the selection signal of the target information control unit, the terminal obtains a source file corresponding to the target information from the server. In an example, a format of the source file of the target information is issued in a URL manner. The format of the source file is an HTML, format, but the HTML, format is not applicable to being displayed in the AR environment. Therefore, the terminal needs to convert the format of the source file of the obtained target information to obtain a format applicable to the AR environment.

The terminal converts the format of the source file of the target information into an AR format, where the AR format is a format applicable to the AR environment. The AR environment is an environment generated according to the AR technology and a real environment. The terminal inputs the source file in the AR format into the AR model to generate an AR element, where the AR element includes an element corresponding to a carrier carrying the target information.

Exemplarily, the target information is video information, and the AR element is any one of a television element, a projection screen element, a display window element, and a billboard element. Exemplarily, the target information is image-text information, and the AR element is any one of a wall element, a bulletin board element, a picture frame element, a desk element, and an art gallery element.

When the bulletin board element, the picture frame element, the desk element, and the art gallery element are used for displaying image information, the image information may be displayed in a predetermined animation special effect form. The animation special effect form includes, but is not limited to: a picture in picture form and an auto-scrolling form.

Step 607. Recognize at least one plane in a three-dimensional world corresponding to the actual image, and construct an AR environment according to the at least one plane.

The plane in the three-dimensional world includes, but is not limited to, at least one of a ground surface, a wall surface, a desk surface, a bench surface, and a cabinet surface. Since there are various elements in the actual image, and each element may have a respective corresponding plane, to simulate the actual image and the AR element more really, the terminal needs to recognize at least one plane in the three-dimensional world. Exemplarily, the terminal recognizes planes in the three-dimensional world as much as possible, to construct an AR world that is more consistent with an actual world.

Figure 8:
FIG. 8 is a schematic diagram of an actual image obtained by a terminal by using a camera according to another exemplary embodiment of this disclosure.

In an example, FIG. 8 shows a schematic diagram of an actual image obtained by a terminal with a camera. In a process of recognizing planes in the actual image of the terminal, a prompt box 801 is displayed on a top of an interface of the actual image shown in FIG. 8, and text "plane recognizing" is prompted in the prompt box 801.

Figure 9:
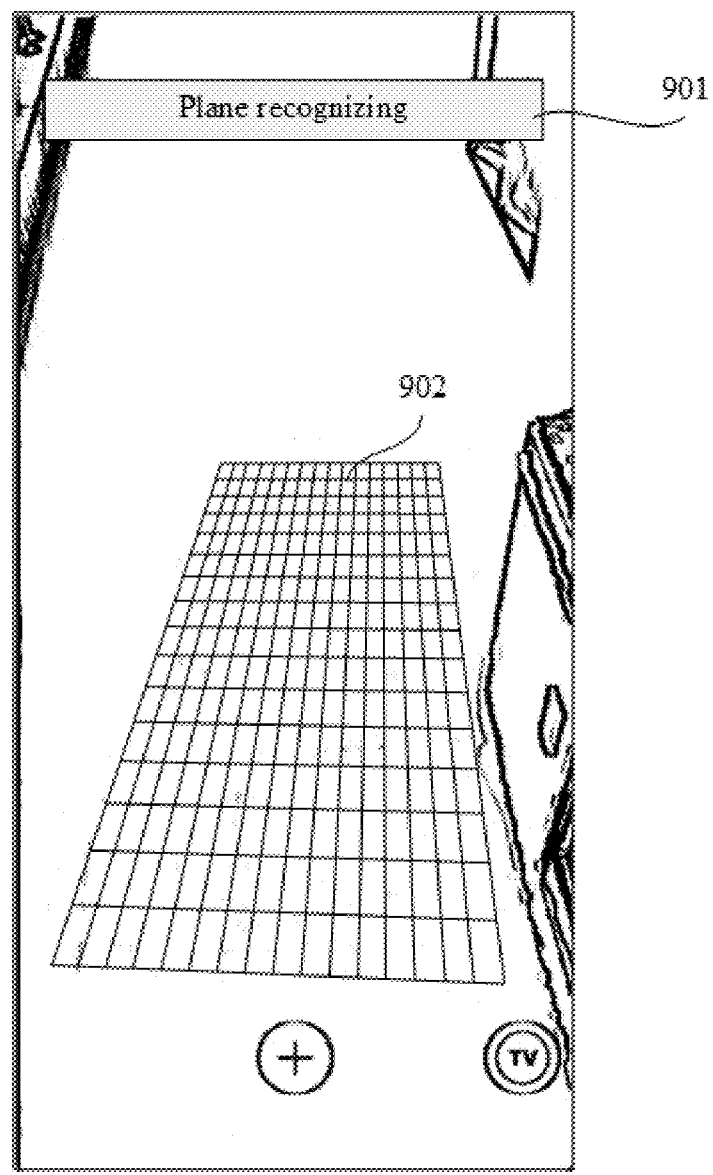
FIG. 9 is a schematic diagram of recognizing a plane in an actual image according to another exemplary embodiment of this disclosure.

FIG. 9 exemplarily shows a schematic diagram of a plane recognized from an actual image. The terminal recognizes the at least one plane in the three-dimensional world corresponding to the actual image shown in FIG. 8 by using a plane detection algorithm to recognize a plane 902 shown in FIG. 9, and text in the prompt box 901 displayed on the top of the interface shown in FIG. 9 is "plane recognizing".

In some situations, planes (for example, a carpet or a floor tile) recognized by the terminal essentially belong to a same plane. The terminal further integrates the plane 902 by using a plane integration algorithm to obtain a plane recognition result in the actual image shown in FIG. 8. The plane integration algorithm is used for integrating at least two planes that are parallel and of which a distance is less than a threshold into a same plane, and the terminal constructs a plane in the AR environment according to the plane recognition result.

Figure 10:
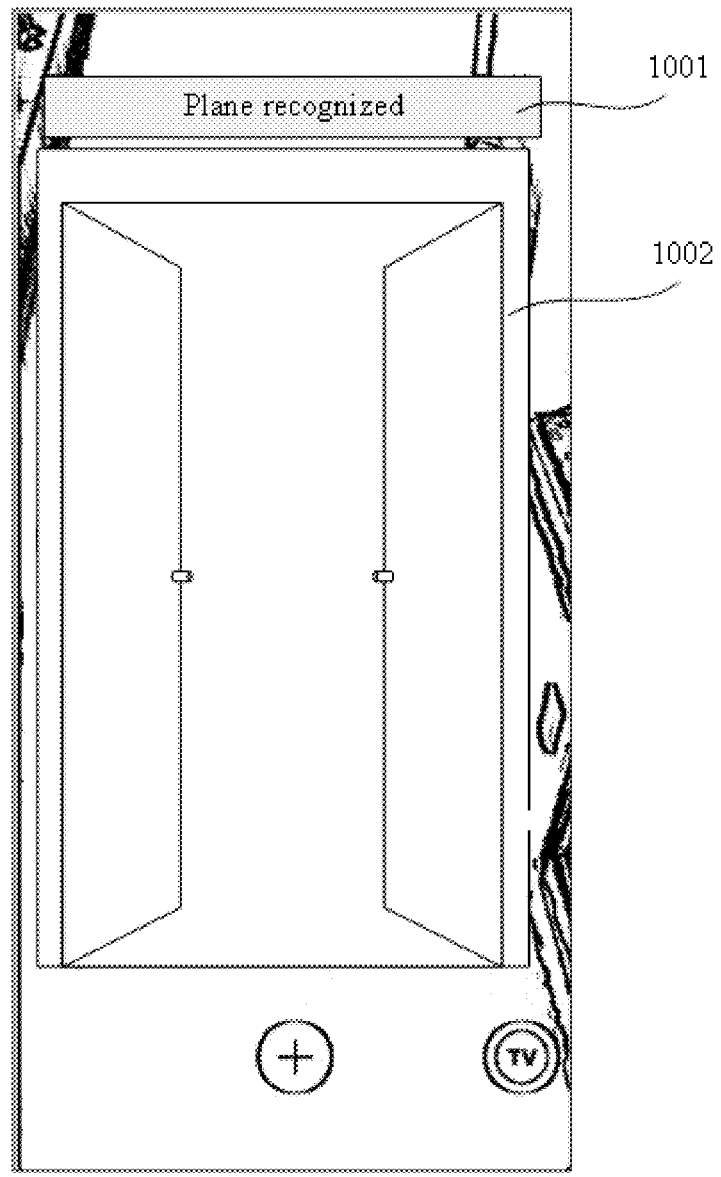
FIG. 10 is a schematic diagram of an AR image according to another exemplary embodiment of this disclosure.

FIG. 10 shows a schematic diagram of an AR image. The terminal determines a ground surface in the AR environment according to the plane recognition result and constructs a portal 1002 on the ground surface in the AR environment. The portal 1002 is located on a vertical plane perpendicular to the ground surface, and the text in a prompt box 1001 displayed on a top of an interface shown in FIG. 10 has changed into "plane recognized". Exemplarily, the portal 1002 is a virtual gate, the virtual gate is configured to connect to (or open, or enter) a virtual room in the AR environment, and the virtual room may be a virtual art gallery provided by the art gallery model.

Figure 11:
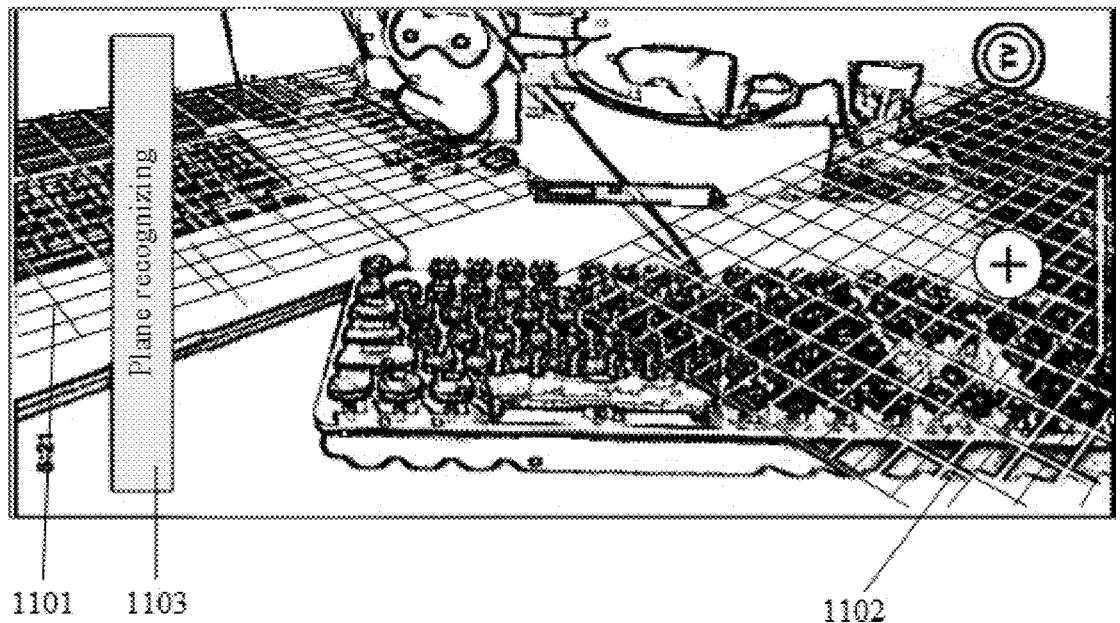
FIG. 11 is a schematic diagram of recognizing a plane in an actual image according to another exemplary embodiment of this disclosure.

In another exemplary implementation, FIG. 11 shows a schematic diagram of recognizing a plurality of planes in an actual image. The terminal obtains an actual image shown in FIG. 11 by using the camera and recognizes the actual image shown in FIG. 11. A prompt box 1103 is displayed on a top of an interface of the actual image shown in FIG. 11, and text "plane recognizing" is prompted in the prompt box 1103. The terminal recognizes the plurality of planes in the three-dimensional world corresponding to the actual image shown in FIG. 11 by using a plane detection algorithm, and recognizes two planes 1101 and 1102 shown in FIG. 11.

Figure 12:
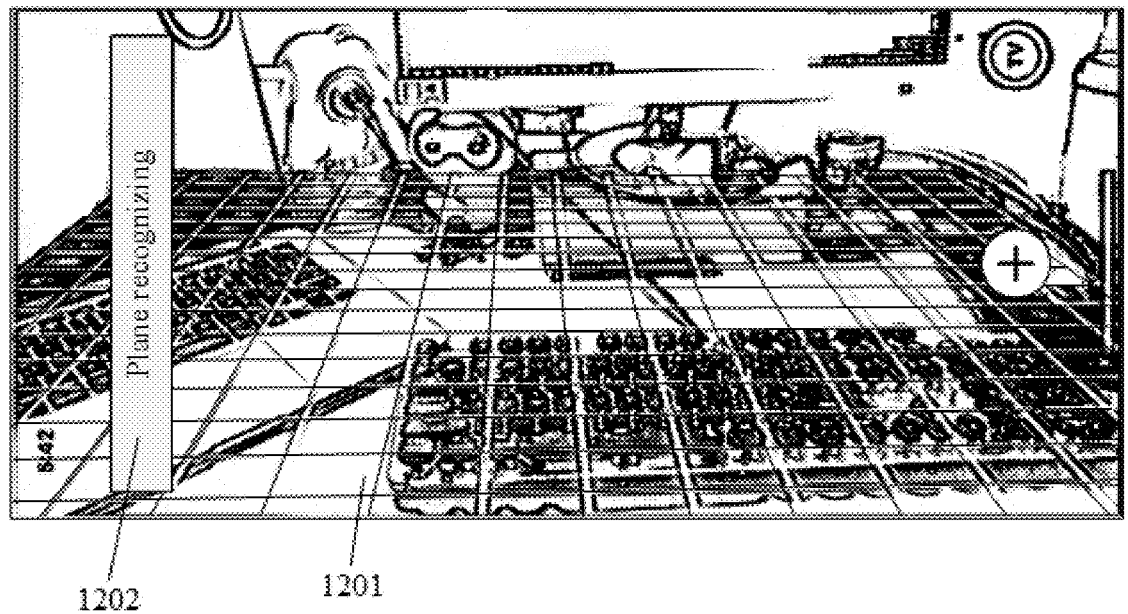
FIG. 12 is a schematic diagram of recognizing a plane in an actual image according to another exemplary embodiment of this disclosure.

FIG. 12 exemplarily shows a schematic diagram of a plane recognized from the actual image. After recognizing the two planes 1101 and 1102 shown in FIG. 11 by using a plane detection algorithm, the terminal integrates the two planes 1101 and 1102 by using a plane integration algorithm to obtain a plane recognition result 1201 in the actual image shown in FIG. 12. The plane recognition result 1201 is obtained by fusing the two planes 1101 and 1102 recognized in FIG. 11 by using a plane integration algorithm. The terminal constructs a plane in the AR environment according to the plane recognition result 1201.

Figure 13:
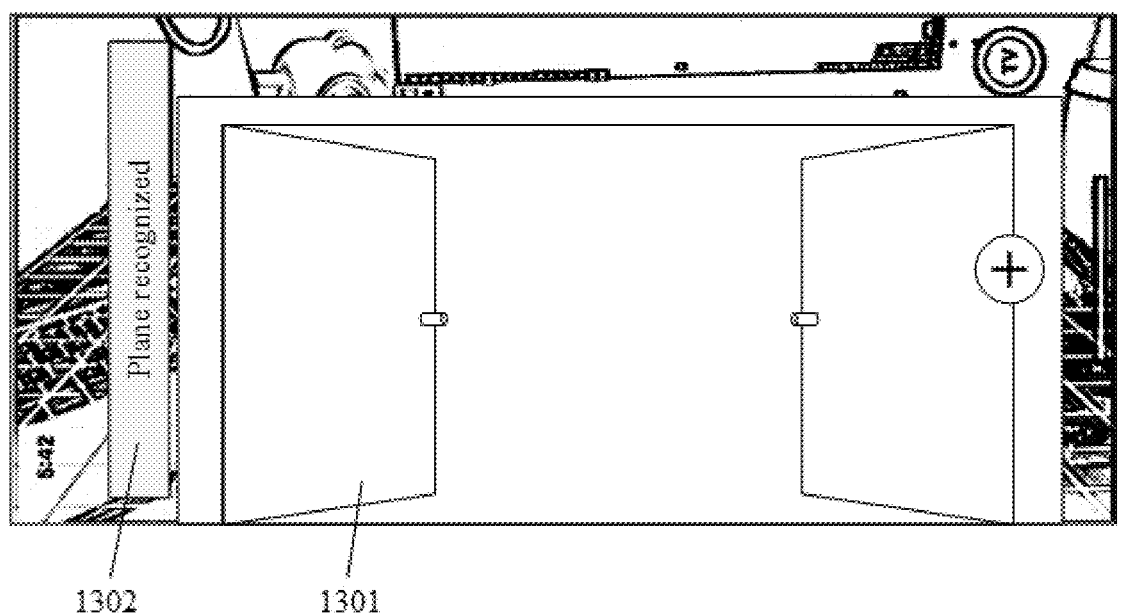
FIG. 13 is a schematic diagram of an AR image according to another exemplary embodiment of this disclosure.

FIG. 13 exemplarily shows a schematic diagram of an AR image. The terminal determines a plane in the AR environment according to the plane recognition result, and constructs a portal 1301 on the plane in the AR environment. The portal 1301 is located on a vertical plane perpendicular to the ground surface, and text in a prompt box 1302 displayed on a top of an interface shown in FIG. 13 has changed into "plane recognized". Exemplarily, the portal 1002 is a virtual gate, the virtual gate is configured to connect to (or open, or enter) a virtual room in the AR environment, and the virtual room may be a virtual art gallery provided by the art gallery model.

Figure 14:
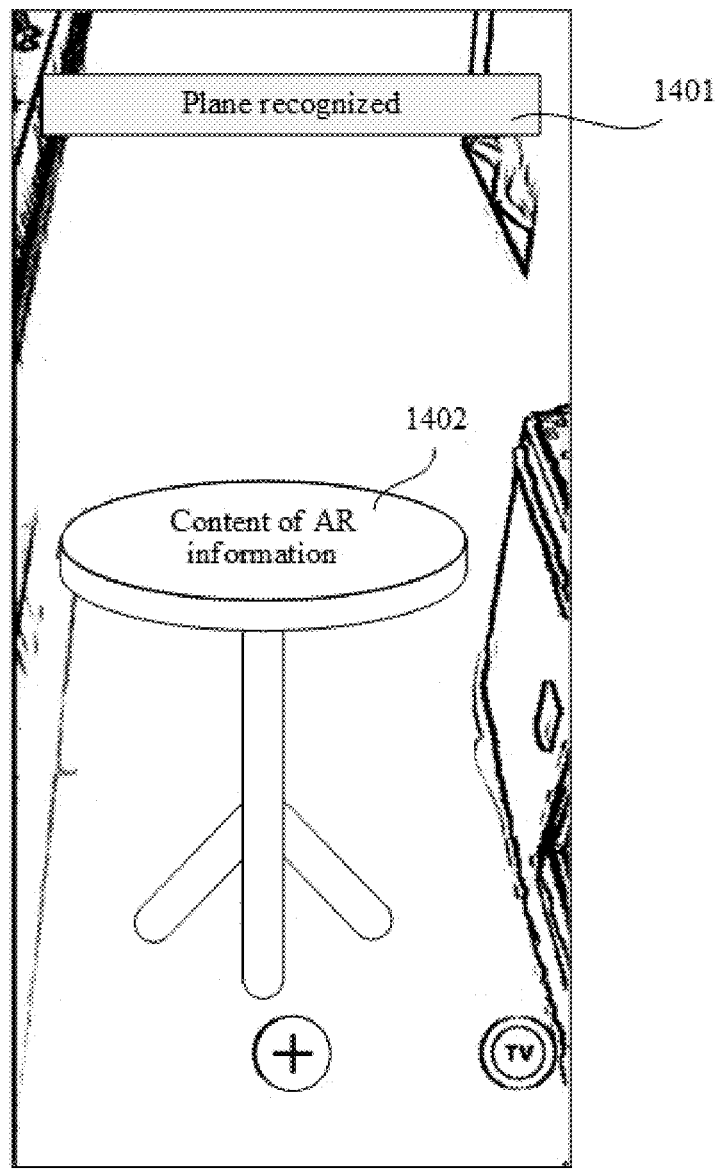
FIG. 14 is a schematic diagram of an AR image according to another exemplary embodiment of this disclosure.

FIG. 14 exemplarily shows a schematic diagram of an AR image. The terminal determines a plane (for example, a ground surface) in the AR environment according to the plane recognition result and generates an AR element on the plane in the AR environment by using an AR model. The AR element exemplarily shown in FIG. 14 is a desk element located on the ground surface. Exemplarily, the AR element in the AR image includes any one of a television element, a projection screen element, a display window element, a billboard element, a wall element, a bulletin board element, a picture frame element, a desk element, and an art gallery element.

Exemplarily, the terminal further determines changes of a position and an angle of the camera by using a dynamic tracking algorithm and changes the plane in the AR environment according to the changes of the camera. Exemplarily, the dynamic tracking algorithm is implemented based on simultaneous localization and mapping (SLAM).

Step 608. Add the AR element to a specified position in the AR environment to overlay the AR element on the actual image, so as to generate an AR image.

In an exemplary implementation, the user enters the portals shown in FIG. 10 and FIG. 13. The terminal displays a virtual room, and the virtual room is constructed by using the plane (for example, the ground plane) in the AR environment as a plane of the virtual room. Exemplarily, the virtual room constructed by the terminal varies according to different models constructing the virtual room, and the virtual room constructed by the terminal is not limited in this embodiment.

Figure 15:
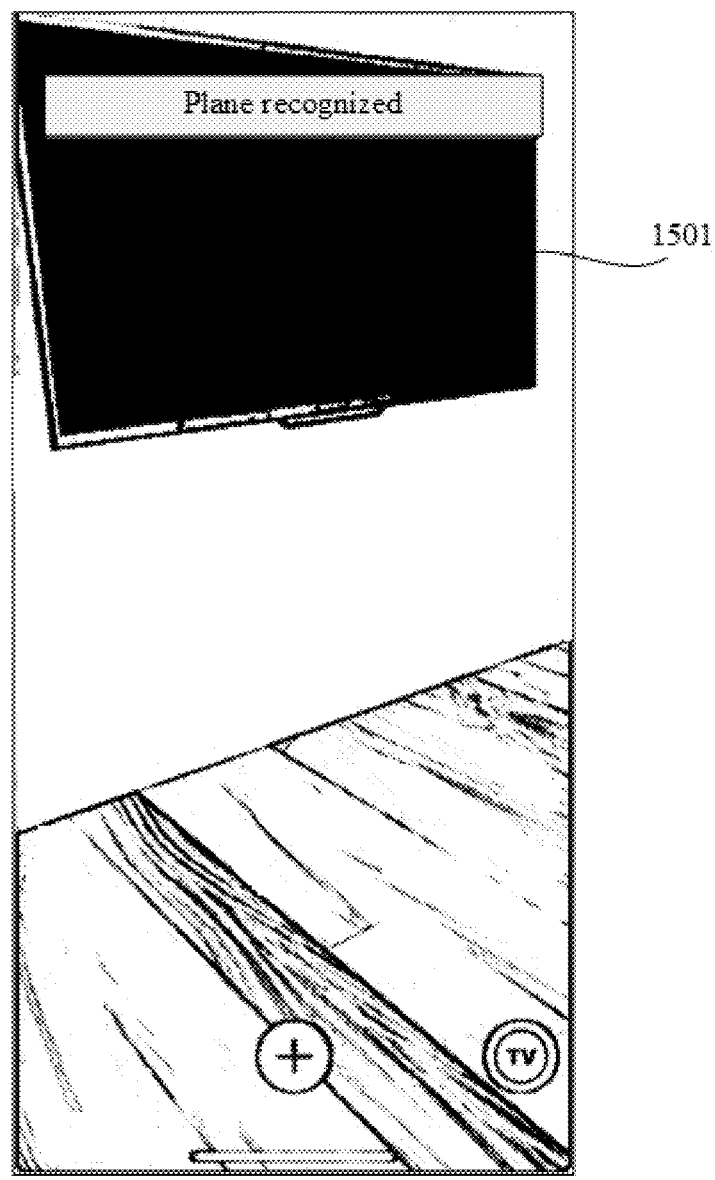
FIG. 15 is a schematic diagram of a displayed television element according to another exemplary embodiment of this disclosure.

Exemplarily, the target information includes video information and image-text information. When the target information is video information, an AR element is displayed in the virtual room constructed by the terminal, and the AR element includes any one of a television element, a projection screen element, a display window element, and a billboard element. Exemplarily, as shown in FIG. 15, a television element 1501 is displayed in the virtual room constructed by the terminal. The terminal adds the television element 1501 to a specified position in the AR environment to overlay the television element on the actual image, so as to generate an AR image. The specified position includes any one of a wall, a desk, a bed, a chair, and a window. For example, the specified position is a centered position on the wall. The video information is displayed on the television element, to create an effect that the video information is a video displayed by a television.

Figure 16:
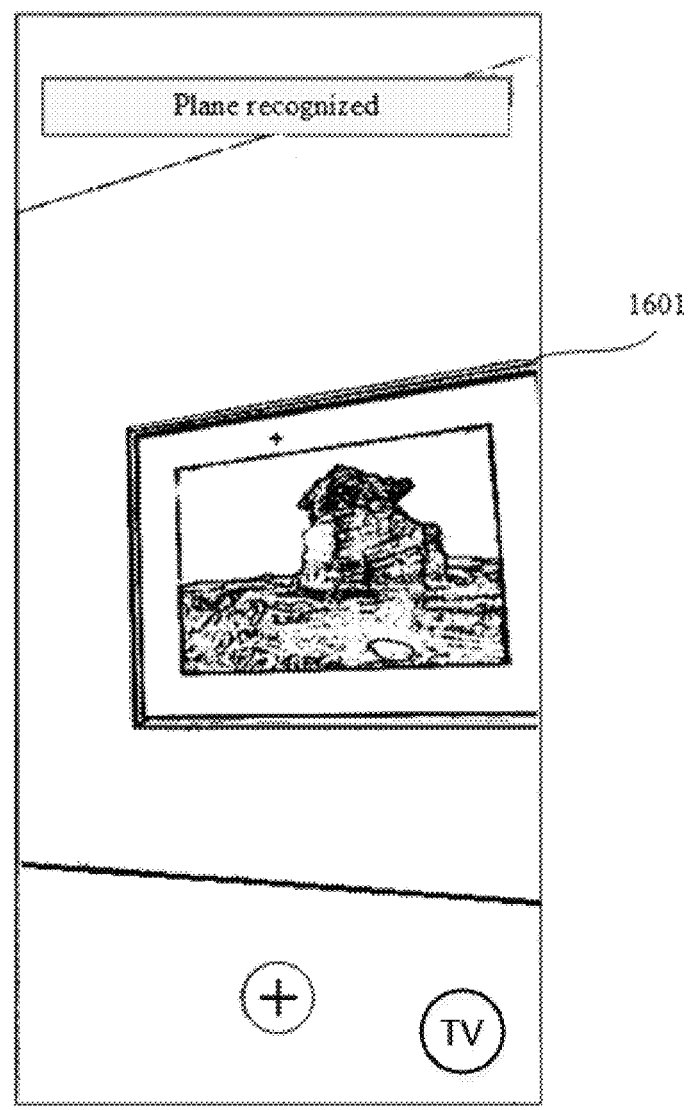
FIG. 16 is a schematic diagram of a displayed picture frame element according to another exemplary embodiment of this disclosure.

When the target information is image-text information, an AR element is displayed in the virtual room constructed by the terminal, and the AR element includes any one of a wall element, a bulletin board element, a picture frame element, a desk element, and an art gallery element. Exemplarily, as shown in FIG. 16, a picture frame element 1601 is displayed in the virtual room constructed by the terminal. The terminal adds the picture frame element 1601 to a specified position in the AR environment to overlay the picture frame element on the actual image, so as to generate an AR image. The image-text information is displayed on the picture frame element.

When the target information includes video information and image-text information, an AR element is displayed in the virtual room constructed by the terminal, and the AR element includes at least one of a television element, a projection screen element, a display window element, a billboard element, a wall element, a bulletin board element, a picture frame element, a desk element, and an art gallery element. The terminal adds the AR element to a specified position in the AR environment to overlay the AR element on the actual image, so as to generate an AR image.

In an implementation, exemplarily, in an AR image shown in FIG. 14, the terminal adds a desk element 1402 to a specified position in the AR environment to overlay the desk element on the actual image, so as to generate an AR image, and the target information is displayed on a surface of the desk element 1402 in a tiled manner.

Description is made above by using an example in which the AR element is a static element. In an exemplary implementation, the AR element is an AR element having an animation effect such as a movable robot element, a movable vehicle element, an animal element, or a cartoon animation element. The AR element has an animation effect that may be played automatically (that is, an animation effect controlled by artificial intelligence), or the AR element has an animation effect, which can be triggered when performing human-computer interaction with the user.

Step 609. Display the AR image in the user interface, an AR element in the AR image being used for displaying the target information.

The terminal displays the AR image on a user interface. For example, the television element in the AR image displays video information, and the picture frame element in the AR image displays image-text information.

Step 610. Receive a trigger signal on the user interface.

The terminal receives a trigger signal on the user interface. The trigger signal is a signal generated by the AR element according to a click event, and/or, the trigger signal is a signal generated by a display control unit according to a click event.

Step 611. Control the position of the AR element according to the trigger signal and/or control displaying of the target information according to the trigger signal.

Exemplarily, the terminal controls the position of the AR element according to a first trigger signal, where the first trigger signal is used for determining the position of the AR element. The first trigger signal includes, but is not limited to: at least one of a click signal triggered on a touch screen, a slide signal triggered on a touch screen, a sensor signal when moving a body of the terminal, a sensor signal when rotating a body of the terminal, a double-eye stare signal, a voice signal, a control signal triggered on a physical peripheral.

Exemplarily, the terminal controls displaying of the target information according to a second trigger signal, where the second trigger signal is used for determining whether the display control is triggered. The second trigger signal includes, but is not limited to at least one of a click signal triggered on a touch screen, a slide signal triggered on a touch screen, a sensor signal when moving a body of the terminal, a sensor signal when rotating a body of the terminal, a double-eye stare signal, a voice signal, a control signal triggered on a physical peripheral.

Figure 17:
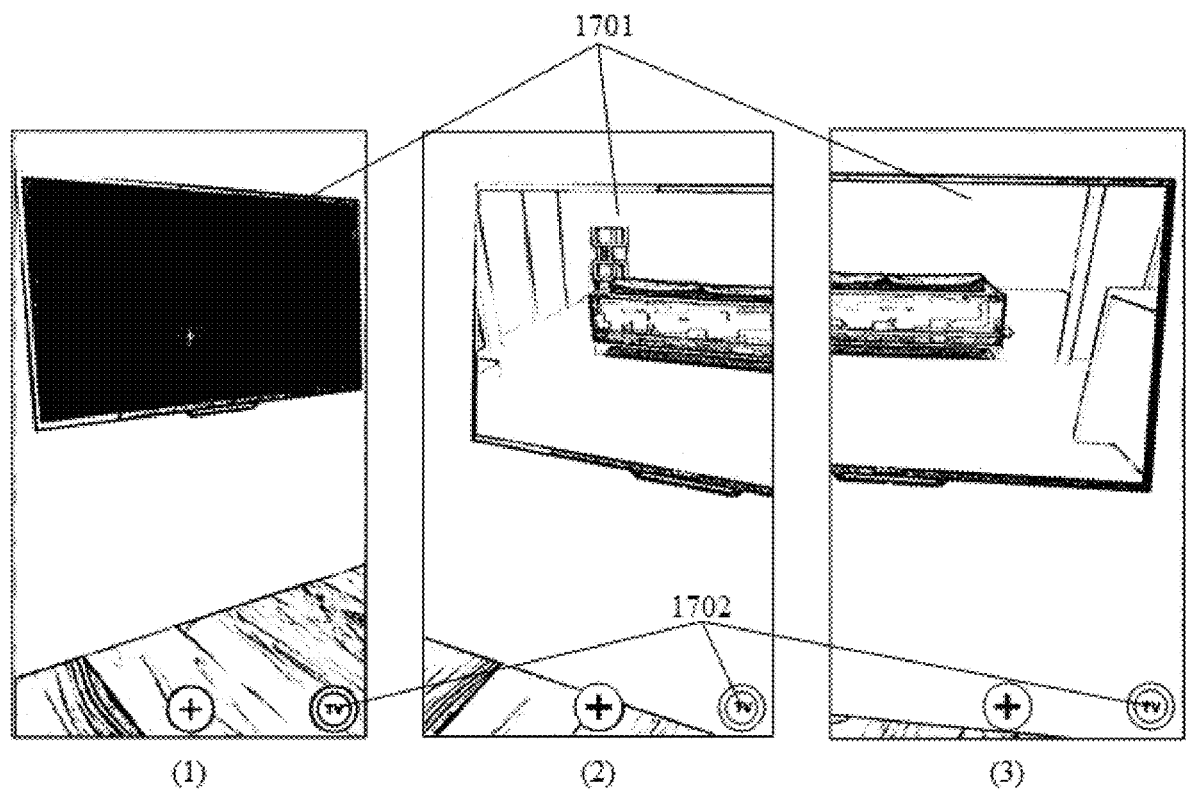
FIG. 17 is a schematic diagram of controlling an AR image according to a trigger signal according to another exemplary embodiment of this disclosure.

For example, FIG. 17 exemplarily shows a schematic diagram of interfaces controlling the AR image according to a trigger signal. The terminal receives a trigger signal (for example, a right-slide signal or a left-slide signal) corresponding to a television element 1701 on the user interface, and controls a position of the television element 1701 according to the trigger signal. Alternatively, the terminal receives a trigger signal corresponding to a display control unit 1702 on the user interface, and controls displaying of the target information according to the trigger signal, where the display control unit is a control unit configured to control the displaying of the target information.

Exemplarily, the terminal receives a trigger signal on the user interface, and controls an angle in which the AR element is displayed according to the trigger signal. For example, the terminal controls angles in which the television element 1701 is displayed in (1), (2), and (3) of FIG. 17 according to the trigger signal.

Exemplarily, the terminal transforms first coordinates of the trigger signal into second coordinates in the AR environment, and executes, when the second coordinates correspond to the AR element, the step of controlling the position of the AR element according to the trigger signal and/or controlling displaying of the target information according to the trigger signal.

Exemplarily, since the trigger signal is a signal generated on a two-dimensional touch screen, the trigger signal has coordinates in a two-dimensional form; while the AR element is an element in a three-dimensional environment and has coordinates in a three-dimensional form. The terminal converts the first coordinates of the trigger signal into the second coordinates in the AR environment and determines the second coordinates corresponding to the AR element according to a coordinate conversion algorithm.

Exemplarily, it is assumed that the z coordinate of X-Y plane of the touch screen in the AR environment is z=0. If coordinates of the trigger signal on the X-Y plane of the touch screen is located are (x, y), it is assumed that the three-dimensional coordinates of the trigger signal are (x, y, z). In computer graphics, coordinate conversion in the three-dimensional environment is performed by using a homogeneous coordinate system. An operation formula of coordinate conversion of the homogeneous coordinate system is as follows:

$$\begin{bmatrix} x_1 \\ y_1 \\ z_1 \\ w_1 \end{bmatrix} = \begin{bmatrix} \cos\theta & -\sin\theta & 0 & \Delta x \\ \sin\theta & \cos\theta & 0 & \Delta y \\ 0 & 0 & 1 & \Delta z \\ 0 & 0 & 0 & 1 \end{bmatrix} * \begin{bmatrix} x \\ y \\ z \\ w \end{bmatrix}$$

As shown in the foregoing formula, a vector is shifted by ($\Delta x$, $\Delta y$, $\Delta z$) and rotates by an angle of $\theta$ clockwise around a z axis. Coordinates ($x_1$, $y_1$, $z_1$) of the vector after the translation and rotation may be determined according to the foregoing operation formula, where w and $w_1$ are proportional coefficients.

Based on the above, according to the method provided in this embodiment of this disclosure, an AR image is generated according to the obtained target information and actual image, and the AR image is displayed on a user interface, where the AR image includes an AR element configured to display the target information. The terminal displays the target information in the AR image by using the AR element to combine the information and the AR technology. This approach enriches the information display manner. During information display, an immersed sense of the user when reading the information is enhanced, and a click rate of the information and a stay time of the user when using the application program are increased.

According to the method provided in this embodiment of this disclosure, an AR model is further determined according to the type of the target information and/or the hardware capability of the terminal, and an AR element is generated according to the target information and the AR model, to make the AR element displayed by the terminal meet the type of the target information and the AR model run by the terminal applicable to the hardware capability of the terminal, so that the AR image displayed by the terminal is clear and meets the type of the target information.

According to the method provided in this embodiment of this disclosure, the format of the source file of the target information is further converted into the AR format, and the source file in the AR format is inputted into the AR model to generate the AR element, so that the target information and the AR technology are combined to implement compatibility between the conventional target information and the AR technology, which enriches the information display manner.

In the embodiment shown based on FIG. 6, the terminal loads an AR model according to the hardware capability of the terminal in step 605. As shown in Table 1, using the terminal running an iOS as an example, an exemplary implementation of loading an AR model according to the hardware capability of the terminal is described through a test on hardware capabilities of an ARKit 1.x and an ARKit 2.x.

TABLE 1

| Test environment | ARKit 1 (iOS11+)/1.5 (iOS11.3+) | | | | ARKit 2 (iOS12+) | | | |
|---|---|---|---|---|---|---|---|---|
| Used engine | SpriteKit (2D) | | SceneKit (3D) | | SpriteKit (2D) | | SceneKit (3D) | |
| Number of displayed nodes | 10 | 1000 | 10 | 1000 | 10 | 1000 | 10 | 1000 |
| Average CPU consumption (%) | 48 | 71 | 49 | 62 | 60 | 80 | 54 | 59 |
| Average memory usage (MB) | 44.9 | 98.9 | 49.5 | 56.9 | 145.8 | 221.6 | 165.5 | 163 |
| Energy consumption | High | Very high | Very high | Very high | High | Very high | Low | High |
| Ratio of CPU energy consumption (%) | 26.40 | 30.90 | 20.00 | 23.80 | 50.00 | 45.20 | 100.00 | 24.10 |
| Ratio of GPU energy consumption (%) | 73.60 | 69.10 | 80.00 | 76.20 | 50.00 | 54.80 | 0.00 | 75.90 |
| Average FPS | 60 | 58 | 60 | 52 | 60 | 60 | 60 | 60 |

As can be seen from Table 1, an AR software development kit (SDK) has an extremely high requirement for a computing capability of a central processing unit (CPU) and a rendering capability of a graphic processing unit (GPU). The server determines an AR model that the terminal can load according to the capabilities of the CPU and the GPU of the terminal, and generates a configuration file of the terminal according to the AR model that the terminal can load.

According to the method provided in this embodiment of this application, the terminal loads an AR model suitable for hardware performance of the terminal according to the hardware capability to avoid a problem that an AR displayed effect is relatively lag due to insufficient capabilities of the CPU and the GPU of the terminal, thereby ensuring an effect that different terminals can run AR models fluently to display the target information.

In the embodiment shown based on FIG. 6, the terminal needs to convert the format of the source file of the target information in step 606.

Figure 18:
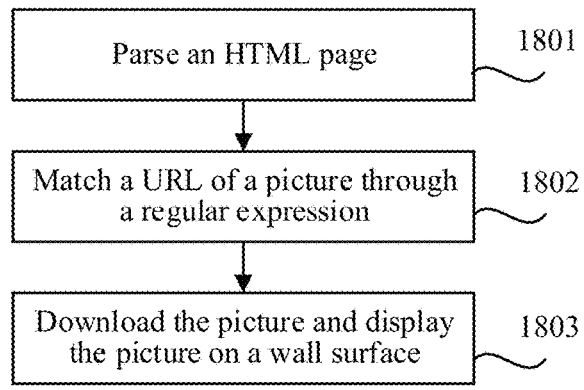
FIG. 18 is a flowchart of an image-text information display method according to an exemplary embodiment of this disclosure.

In an exemplary implementation, FIG. 18 shows a flowchart of an image-text information display method, and the method includes:

Step 1801. Parse a Hyper Text Markup Language (HTML) page.

After an information control unit of the target information is triggered, the terminal obtains a web link of the target information from the information control unit, and the terminal obtains a source file of the target information from the server according to the web link of the target information. Using the target information of image-text information as an example, the terminal obtains a source file of the image-text information from the server. The format of the source file is an HTML format, and the terminal parses the source file in the HTML format.

Step 1802. Match a uniform resource locator (URL) of a picture through a regular expression.

After obtaining the source file in the HTML format of the image-text information, the terminal determines a URL of a picture from the source file in the HTML format through a regular expression.

Step 1803. Download the picture and display the picture on a wall surface.

When the URL of the picture is determined, the terminal downloads the picture according to the URL of the picture. The terminal inputs the downloaded picture into an AR model to generate an AR element.

Exemplarily, the AR element includes any one of a wall element, a bulletin board element, a picture frame element, a desk element, and an art gallery element. Exemplarily, the terminal displays the AR element on the wall surface.

Figure 19:
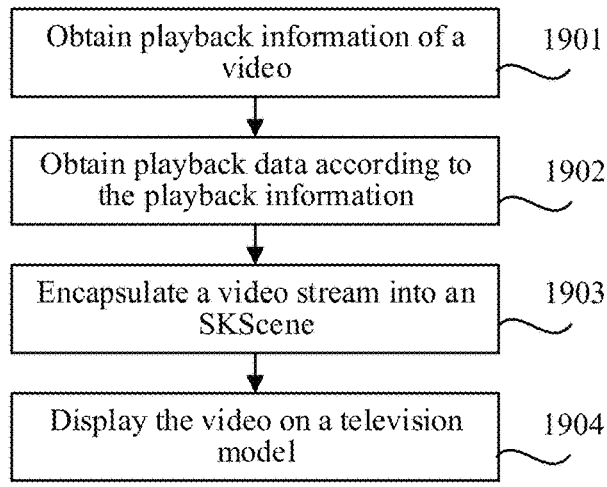
FIG. 19 is a flowchart of a video information display method according to an exemplary embodiment of this disclosure.

In another exemplary implementation, FIG. 19 shows a flowchart of a video information display method, and the method includes:

Step 1901. Obtain playback information of a video.

After an information control unit of the target information is triggered, the terminal obtains a web link of the target information from the information control unit, and the terminal obtains a source file of the target information from the server according to the web link of the target information. Using the target information of video information as an example, the terminal obtains playback information of a video from the server. The playback information includes a stream media playback website of the video.

Step 1902. Obtain playback data according to the playback information.

The terminal obtains playback data according to the playback information. For example, the terminal downloads the playback data of the video according to the stream media playback website of the video, where the playback data includes a video stream in a source file format.

Step 1903. Encapsulate the video stream into a SKScene.

The terminal encapsulates the video stream in the source file format into a SKScene SKScene is a video format that can be loaded to the AR environment. That is, the SKScene is an AR format of the video information.

Step 1904. Display the video on a television model.

The terminal extracts video data in an AR format and inputs the video data in the AR format into an AR model to generate an AR element.

Exemplarily, the AR element includes any one of a television element, a projection screen element, a display window element, and a billboard element. Exemplarily, the terminal displays the AR element on the television element.

According to the method provided in this embodiment of this disclosure, the format of the target information is adaptively converted, as a source file of the target information is converted into an AR format. This approach realizes compatibility between the target information in a conventional format and data in the AR format, thereby ensuring displaying of the target information in the AR environment.

Figure 20:
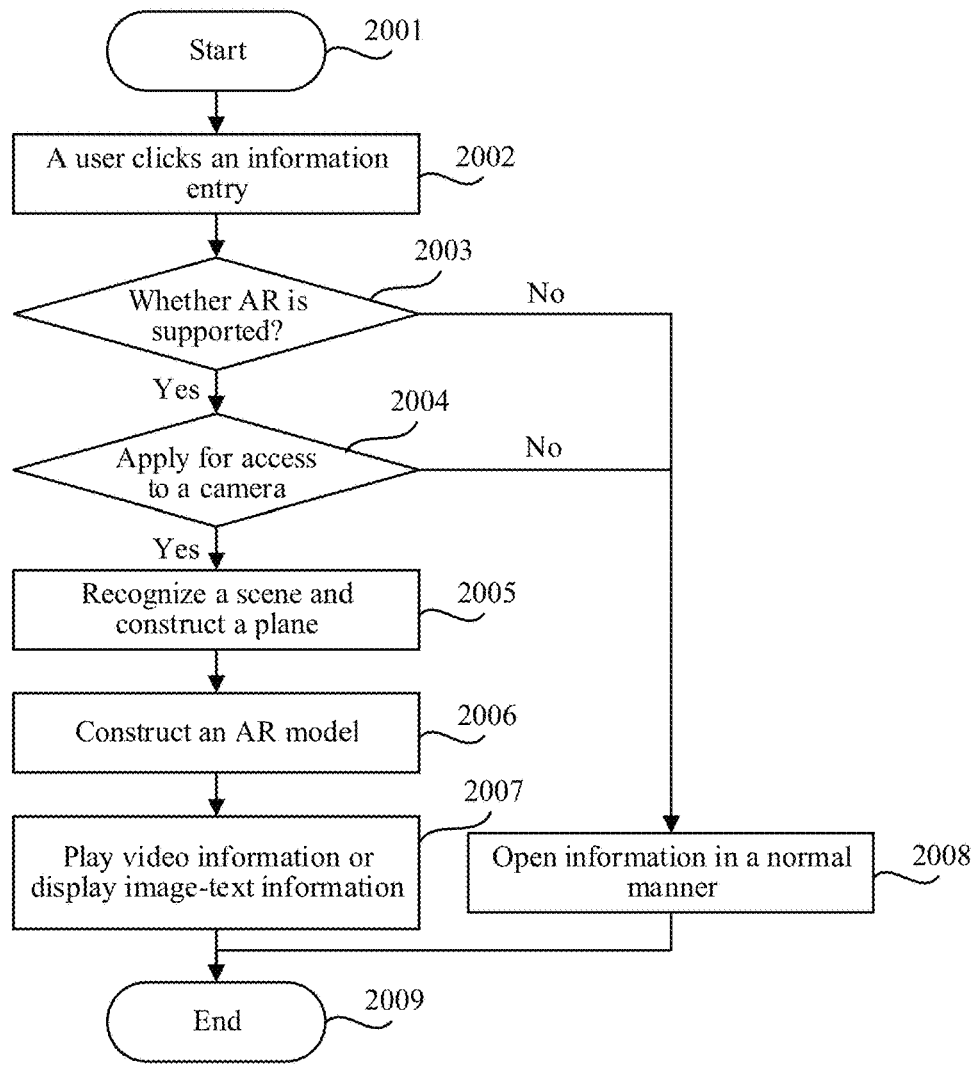
FIG. 20 is a flowchart of an information display method according to an exemplary embodiment of this disclosure.

FIG. 20 is a flowchart of an information display method according to an exemplary embodiment of this disclosure. The method may be applicable to the system shown in FIG. 3. The method includes the following steps:

Step 2001. Start.

An application program is installed in a terminal, and an icon of the application program is displayed on a desktop of the terminal. The application program is a program having an information display function, and the icon of the application program is an information entry.

Step 2002. A user clicks an information entry.

The terminal displays the information entry (the icon of the application program) on a screen, and the information entry is configured to for a user to enter an application program having an information display function. The user clicks the information entry to enter the application program displaying information.

Step 2003. Whether AR is supported?

The application program determines whether the terminal supports running AR. If the terminal supports running AR, step 2004 is performed; if the terminal does not support running AR, step 2008 is performed.

Exemplarily, the application program determines whether a camera is disposed on the terminal and whether a program component related to AR is installed. When a camera is disposed on the terminal and the program component related to AR is installed, it is determined that the terminal supports AR; when no camera is disposed on the terminal or the program component related to AR is not installed, it is determined that the terminal does not support AR.

Step 2004. Apply for access to a camera?

The application program determines whether access to the camera is permitted, and step 2005 is performed if the access to the camera of the application program is permitted.

If the access to the camera of the application program is not permitted (for example, in the first run), the application program initiates a request for access to the camera, and step 2005 is performed if the application is passed.

If the access to the camera of the application program is not permitted, the application program initiates a request for access to the camera, and step 2008 is performed if the request is not granted.

Exemplarily, the application program initiates an application for access to the camera to an operating system of the terminal, the operating system of the terminal pops up an authorization window on the desktop. The authorization window is configured to query the user whether to authorize the application program the access to the camera, and a "confirm" button and a "cancel" button are displayed on the authorization window. When the user clicks the "confirm" button, it is determined that the application of the application program is passed; when the user clicks the "cancel" button, it is determined that the application of the application program is not passed.

Step 2005. Recognize a scene and construct a plane.

When the access of the application program displaying information to the camera is permitted, the terminal enables the camera and obtains an actual image by using the camera.

The terminal recognizes at least one plane (for example, a ground surface, a desk surface, and a wall surface in a real environment) in a corresponding three-dimensional world in the actual image by using a plane detection algorithm. When there are two or more similar planes, the at least one plane is integrated by using a plane integration algorithm to obtain a plane recognition result of the actual image.

The terminal constructs a plane in the AR environment according to the plane recognition result of the three-dimensional world in the actual image. The plane in the AR environment corresponds to the plane in the three-dimensional world in the actual image, to implement a better augmented reality effect.

Step 2006. Construct an AR model.

The terminal loads an AR model according to a type of target information and/or a hardware capability of the terminal.

Step 2007. Play video information or display image-text information.

The terminal generates an AR element according to the target information and the AR model and adds the AR element to a specified position in the AR environment to overlay the AR element on the actual image, so as to generate an AR image.

Exemplarily, the terminal loads a first AR model when a type of the target information is video information, where the first AR model is any one of a television model, a projection screen model, a display window model, and a billboard model. The terminal generates a first AR element according to the target information and the first AR model, where the first AR element is any one of a television element, a projection screen element, a display window element, and a billboard element. The terminal adds the first AR element to a specified position in the AR environment to overlay the first AR element on the actual image, so as to generate a first AR image, where the first AR image is an AR image displaying video information.

The terminal loads a second AR model when the type of the target information is image-text information, where the second AR model is any one of a wall model, a bulletin board model, a picture frame model, a desk model, and an art gallery model. The terminal generates a second AR element according to the target information and the second AR model, where the second AR element is any one of a wall element, a bulletin board element, a picture frame element, a desk element, and an art gallery element. The terminal adds the second AR element to a specified position in the AR environment to overlay the second AR element on the actual image, so as to generate the AR image, where the second AR image is an AR image displaying image-text information.

Step 2008. Open information in an ordinary manner.

When the application program displaying information determines that the terminal does not support running AR, or the access of the application program to the camera is not permitted, the application program opens information on a screen of the terminal in a tiled manner.

Step 2009. End.

Figure 21:
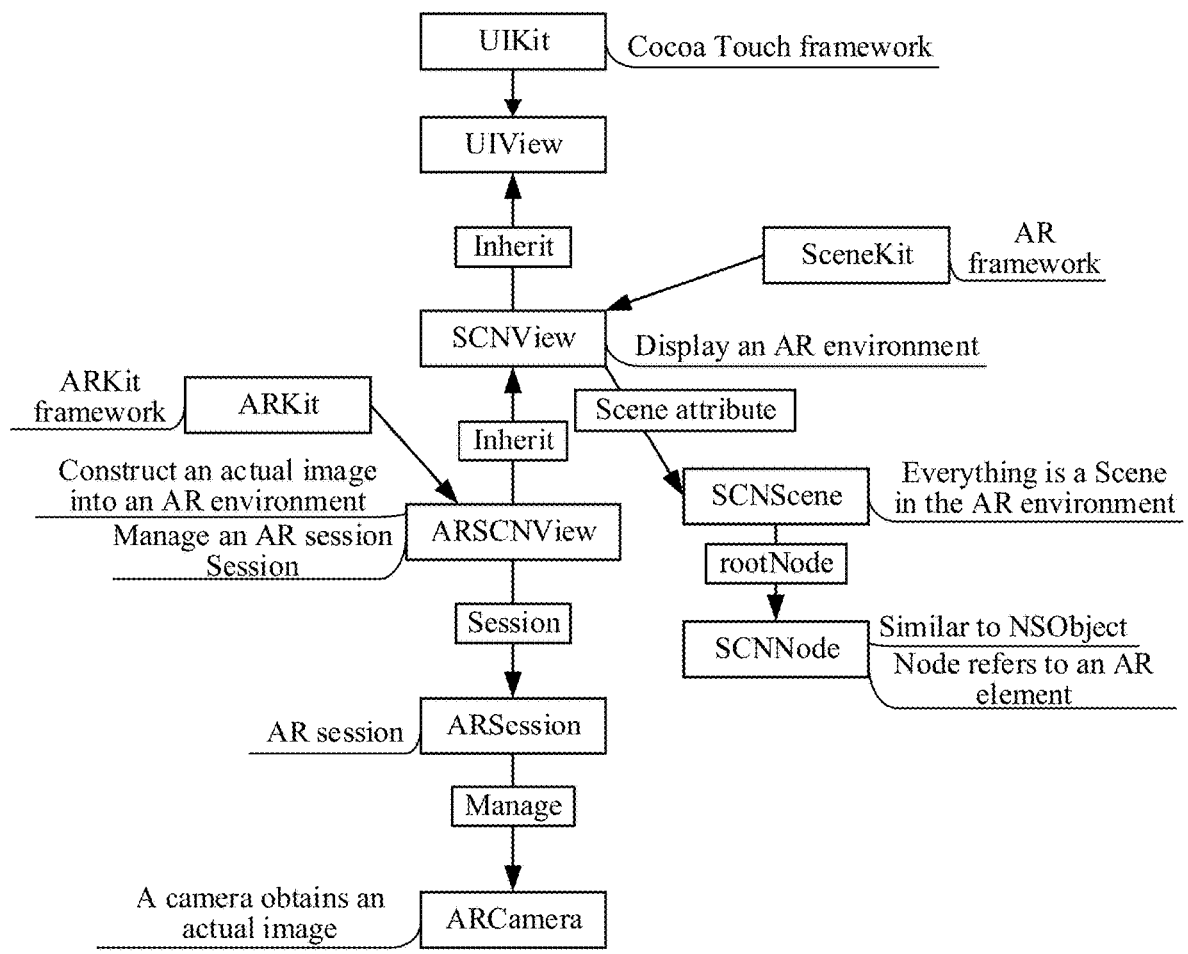
FIG. 21 is a flowchart of constructing an AR environment by a terminal by using an ARKit according to an exemplary embodiment of this disclosure.

In the embodiment shown based on FIG. 20, as shown in FIG. 21, a flowchart of the terminal constructing an AR environment by using an ARKit is described by using an example in which the terminal is equipped with a mobile operating system (an iOS system) produced by the Apple company.

In FIG. 21, an ARKit framework is configured to convert a real environment obtained by a camera ARCamera into an actual image. That is, the ARKit framework is configured to display an actual image in a real environment captured by the camera ARCamera. A SceneKit framework is configured to display an AR image in an AR environment, where the AR environment is an environment constructed according to the actual image and an AR model.

ARSCNView is configured to display the actual image according to the real environment obtained by the camera ARCamera under the ARKit framework. The ARSCNView is a view container configured to manage ARSession. The ARSession is configured to generate an actual image according to an image in the real environment captured by the camera ARCamera. That is, the ARSession is a bridge transmitting data between the camera ARCamera and the ARSCNView. The ARKit integrates a set of complete plane detection and dynamic tracking algorithms of a visual-inertial odometry (VIO) algorithm based on SLAM.

The ARSCNView is inherited from SCNView in the SceneKit framework, and the SCNView is inherited from UIView in a UIKit framework. The UIView is configured to display the AR image in a window of an iOS device, and the SCNView is configured to display the AR image according to the constructed AR environment under the SceneKit framework. Cocoa Touch is a running environment of programs of the iOS operating system.

The ARKit framework uses a function of parent-class SCNView to add the AR element in the actual image, that is, generates an AR element according to the AR model and the target information. The parent-class SCNView is configured to overlay the AR element in the actual image. Each AR model is a node SCNNode, and each node SCNNode forms an SCNScene. That is, an AR element is generated according to the AR model and the target information, the SCNScene adds the AR element to the actual image to construct an AR environment, the SCNView displays an AR image on which the AR element is overlaid, and the AR image is an image in the AR environment.

As can be known from the above content, the camera ARCamera is configured to capture an image in the real environment, and the camera ARCamera does not directly participate in a process of displaying the actual image.

Exemplarily, a work process of the ARKit includes: ARSCNView loads an SCNScene to construct an AR environment; the SCNScene enables a camera ARCamera to obtain an actual image; after obtaining the actual image, the ARSCNView starts to recognize planes in the actual image to obtain recognized data, and gives the recognized data to ARSession; the ARSession performs dynamic tracking on the actual image by managing ARSessionConfiguration and returns an ARFrame; the SCNScene adds a node SCNNode to the actual image of the ARSCNView and generates an AR element according to an AR model corresponding to the node SCNNode and the target information, the SCNScene adds the AR element to the actual image, and the SCNView displays an AR image on which the AR element is overlaid.

The ARSessionConfiguration is configured to dynamically track the position of the camera ARCamera, and can calculate a real matrix position of the AR model relative to the camera ARCamera when adding the AR model.

The foregoing example is described by using the iOS system as an example, when an Android system is installed in the terminal, the ARKit framework may be replaced with an ARCore framework provided by the Google company.

In an example, the application program of the terminal uses a control list to display an information control having a plurality of pieces of information. The target information is a group of official advertising pictures of a phone with a folded screen, after the user clicks a title of the target information, the application program obtains the target information and an art gallery model configured to carry the target information from the server, where the art gallery model includes a portal model and a virtual room model. Besides, the application program further determines whether access to the camera is permitted. When the access of the application program to the camera is permitted, an actual image is acquired by using the camera and a ground surface in the actual image is recognized. When the ground surface in the actual image is recognized, the application program displays the portal model based on the ground surface, where a door plane of the portal model is perpendicular to the ground surface, and the portal model is located in front of the user. When the user holds the terminal and moves forward, the portal model opens and displays a virtual room element. The virtual room element is an element generated based on the virtual room model, and the official advertising pictures of the phone with a folded screen arranged as an array exist on a wall of the virtual room element. Since the virtual room model may be a virtual room arranged according to a science fiction subject, the user may view the official advertising pictures of the phone with a folded screen in the virtual room of the science fiction subject, thereby achieving a visual experience similar to a product release conference.

In an example, the application program of the terminal uses a control list to display an information control having a plurality of pieces of information. The target information is a trailer of a science fiction movie, after the user clicks a title of the target information, the application program obtains the trailer of the science fiction movie and a cinema model configured to carry the trailer from the server, where the cinema model includes a giant screen. Besides, the application program further determines whether access to the camera is permitted. When the access of the application program to the camera is permitted, an actual image is acquired by using the camera and a wall surface in the actual image is recognized. When the wall surface in the actual image is recognized, the application program displays a cinema element based on the wall surface, and a giant screen in the cinema element is attached to the upper of the wall surface. The giant screen loads and plays the trailer of the science fiction movie, to bring a feeling of watching the trailer of the science fiction movie in a giant screen cinema to the user. If the giant screen cannot be completely displayed on the screen of the terminal, different parts of the giant screen may be viewed by moving the position of the terminal.

Exemplarily, physical buttons are further disposed on the terminal, such as a volume up button and a volume down button. When video information is played by using an AR element, the physical buttons on the terminal have a function of a remote controller, and functions of display, pause, switch, volume up, and volume down of the video information may be remotely controlled by using the physical buttons.

The information display method provided in the foregoing embodiment is further applicable to dynamic displaying of music, or may be combined with scenes such as advertisement content or operational activities that can enhance user's immersive experience.

The following describes apparatus embodiments of this application, which can be used for executing the method embodiments of this application. For details not disclosed in the apparatus embodiments of this application, refer to the method embodiments of this application.

Figure 22:
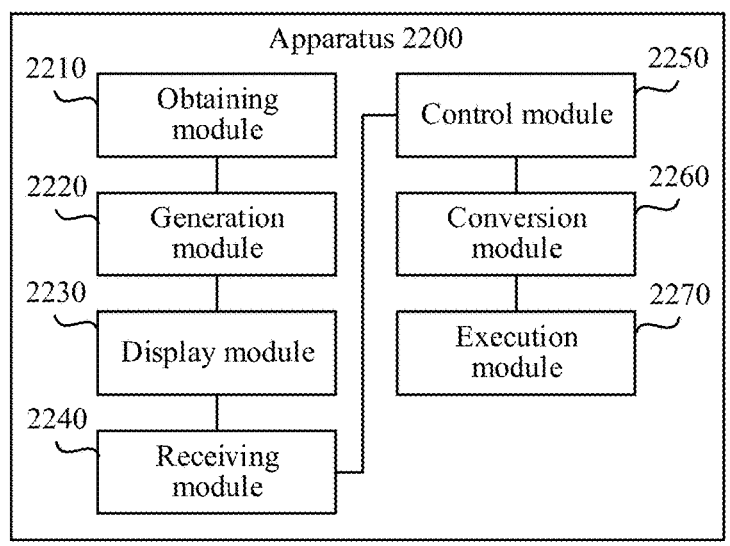
FIG. 22 is an apparatus structural diagram of an information display apparatus according to an exemplary embodiment of this disclosure.

FIG. 22 shows an apparatus structural diagram of an information display apparatus according to an exemplary embodiment of this disclosure. The apparatus may be implemented as all or a part of a terminal by using software, hardware, or a combination thereof. The apparatus 2200 includes:

an obtaining module 2210, configured to obtain target information and an actual image when an information display signal is received, the actual image being an image obtained by photographing a real environment by using a camera;

a generation module 2220, configured to generate an AR image according to the target information and the actual image; and a display module 2230, configured to display the AR image in a user interface, an AR element in the AR image being used for displaying the target information.

Exemplarily, the target information is video information, and the AR element is any one of a television element, a projection screen element, a display window element, and a billboard element; and/or, the target information is image-text information, and the AR element is any one of a wall element, a bulletin board element, a picture frame element, a desk element, and an art gallery element.

Figure 23:
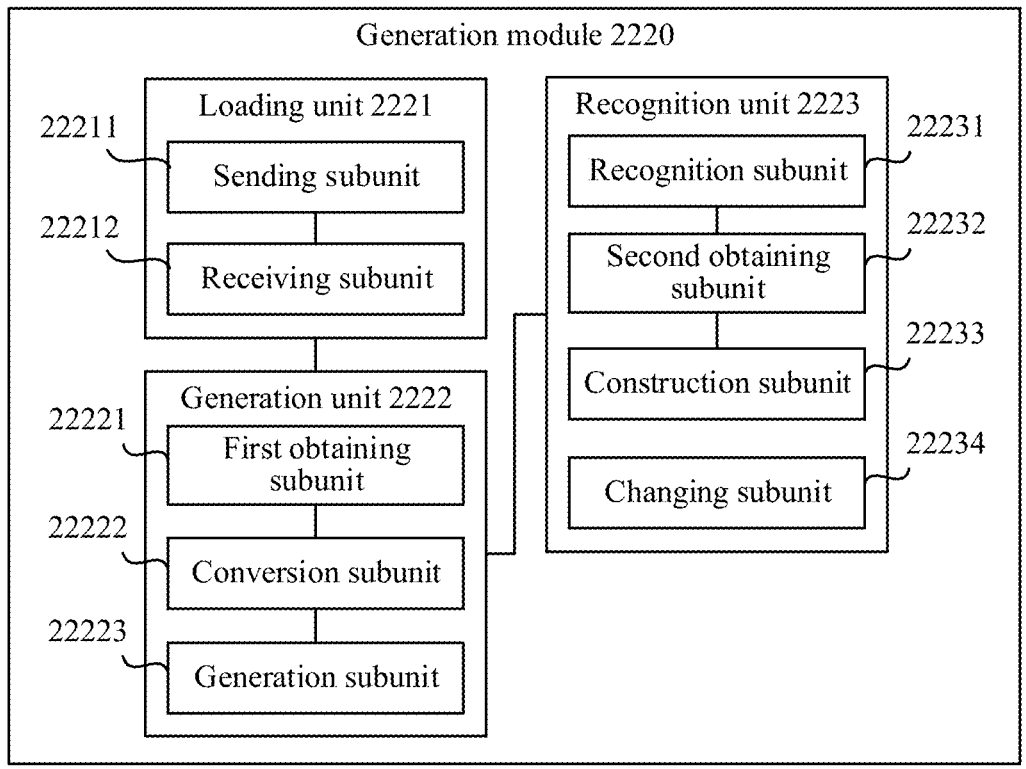
FIG. 23 is an apparatus structural diagram of a generation module according to an exemplary embodiment of this disclosure.
Figure 24:
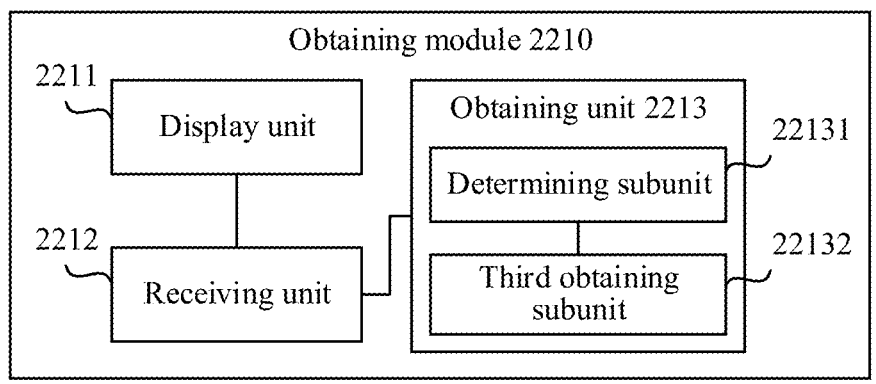
FIG. 24 is an apparatus structural diagram of an obtaining module according to an exemplary embodiment of this disclosure.

Exemplarily, as shown in FIG. 23, the generation module 2220 includes:

a loading unit 2221, configured to load an AR model according to a type of the target information and/or a hardware capability of a terminal;

a generation unit 2222, configured to generate an AR element according to the target information and the AR model;

a recognition unit 2223, configured to recognize at least one plane in a three-dimensional world corresponding to the actual image, and construct an AR environment according to the at least one plane; and the generation unit 2222 being configured to add the AR element to a specified position in the AR environment to overlay the AR element on the actual image, so as to generate the AR image.

In an exemplary implementation, the loading unit 2221 is configured to load a first AR model when a type of the target information is video information, and the first AR model is any one of a television model, a projection screen model, a display window model, and a billboard model.

In another exemplary implementation, the loading unit 2221 is configured to load a second AR model when the type of the target information is image-text information, and the second AR model is any one of a wall model, a bulletin board model, a picture frame model, a desk model, and an art gallery model.

In another exemplary implementation, the loading unit 2221 includes:

a sending subunit 22211, configured to send a hardware capability of the terminal to a server, the hardware capability of the terminal being a capability applicable to the AR model loaded by the terminal; and a receiving subunit 22212, configured to receive a third AR model sent by the server, the third AR model including an AR model configured by the server according to the hardware capability of the terminal.

Exemplarily, the generation unit 2222 includes:

a first obtaining subunit 22221, configured to obtain a source file corresponding to the target information from a server;

a conversion subunit 22222, configured to convert a format of the source file to an AR format, the AR format being a format applicable to the AR environment; and a generation subunit 22223, configured to input the source file in the AR format to the AR model to generate the AR element.

Exemplarily, the recognition unit 2223 includes:

a recognition subunit 22231, configured to recognize at least one plane in the three-dimensional world corresponding to the actual image by using a plane detection algorithm;

a second obtaining subunit 22232, configured to integrate the at least one plane by using a plane integration algorithm to obtain a plane recognition result in the actual image; and a construction subunit 22233, configured to construct a plane in the AR environment according to the plane recognition result.

Exemplarily, the recognition unit 2223 further includes:

a changing subunit 22234, configured to change the plane in the AR environment according to changes of the camera by using a dynamic tracking algorithm.

Exemplarily, the apparatus 2200 further includes:

a receiving module 2240, configured to receive a trigger signal on the user interface;

a control module 2250, configured to control the position of the AR element according to the trigger signal and/or control displaying of the target information according to the trigger signal.

Exemplarily, the apparatus 2200 further includes:

a transformation module 2260, configured to transform first coordinates of the trigger signal into second coordinates in the AR environment; and an execution module 2270, configured to execute, when the second coordinates correspond to the AR element, the step of controlling the position of the AR element according to the trigger signal and/or controlling displaying of the target information according to the trigger signal.

Exemplarily, the obtaining module 2210 includes:

a display unit 2211, configured to display an information list interface, the information list interface displaying a plurality of information controls, and each information control in the plurality of information controls being configured for displaying one piece of information;

a receiving unit 2212, configured to receive a selection signal on a target information control unit in the plurality of information controls;

an obtaining unit 2213, configured to obtain target information corresponding to the target information control unit; and the obtaining unit 2213 being configured to obtain an actual image by using a camera after receiving the selection signal.

Exemplarily, the obtaining unit 2213 includes:

a determining subunit 22131, configured to determine whether access to the camera is permitted; and a third obtaining subunit 22132, configured to enable the camera and obtain the actual image when it is determined that access to the camera is permitted.

The information display apparatus provided in the foregoing embodiments is illustrated with an example of division of the foregoing functional modules. In actual application, the foregoing functions may be allocated to and completed by different functional modules according to requirements, that is, the internal structure of the apparatus is divided into different functional modules, so as to complete all or part of the functions described above. In addition, the information display apparatus and method embodiments of the information display method provided in the foregoing embodiments belong to one conception. For the specific implementation process, reference may be made to the method embodiments, and details are not described herein again.

Figure 25:
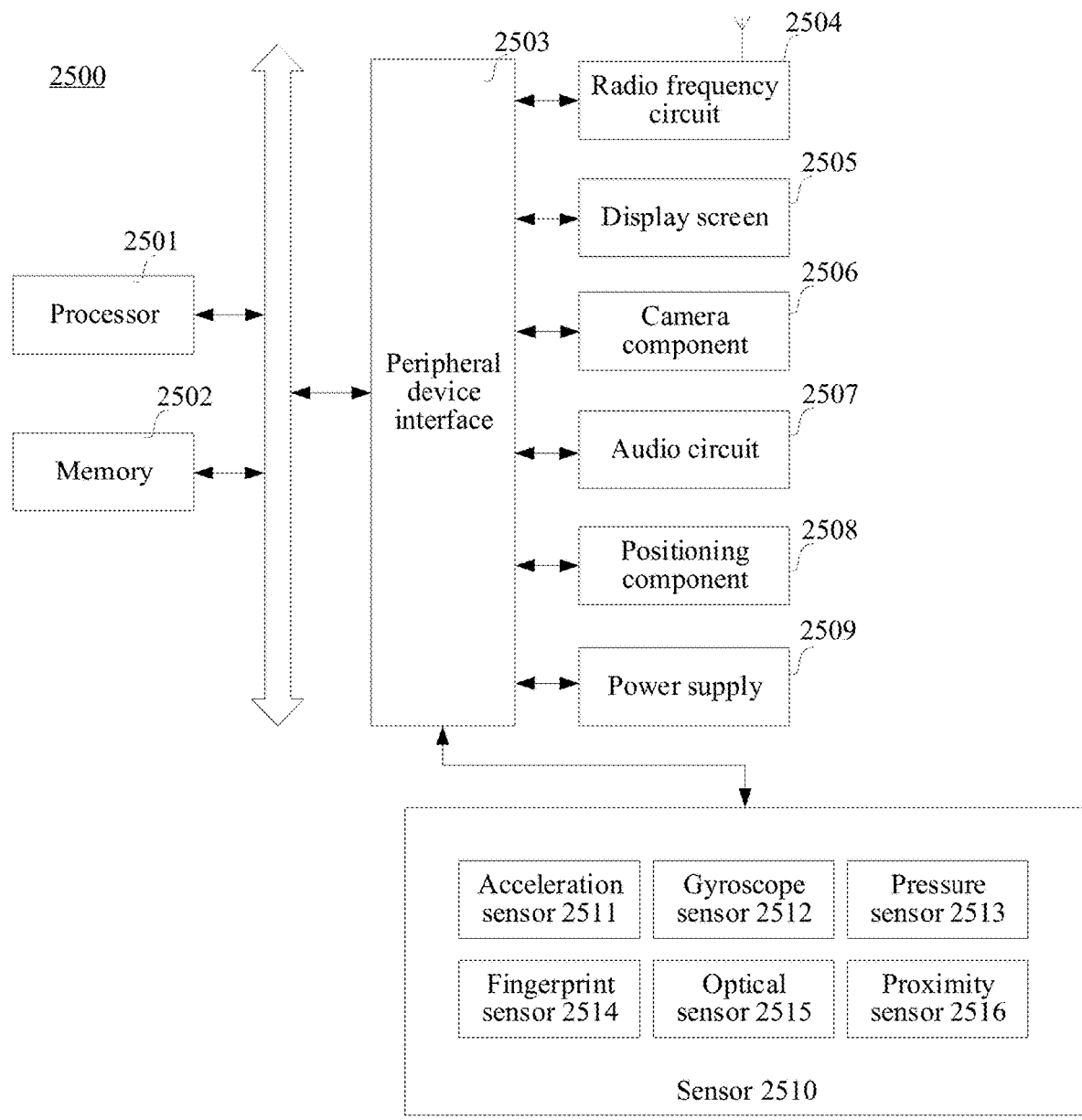
FIG. 25 is a structural block diagram of a terminal according to an exemplary embodiment of this disclosure.

FIG. 25 shows a structural block diagram of a terminal 2500 according to an exemplary embodiment of this disclosure. The terminal 2500 may be a smartphone, a tablet computer, a moving picture experts group audio layer III (MP3) player, a moving picture experts group audio layer IV (MP4) player, a notebook computer, or a desktop computer. The terminal 2500 may also be referred to as another name such as user equipment, a portable terminal, a laptop terminal, a desktop terminal or the like.

Generally, the terminal 2500 includes a processor 2501 and a memory 2502.

The processor 2501 may include one or more processing cores, for example, a 4-core processor or an 8-core processor. The processor 2501 may be implemented in at least one hardware form of a digital signal processor (DSP), a field-programmable gate array (FPGA), and a programmable logic array (PLA). The processor 2501 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 2501 may be integrated with a graphics processing unit (GPU). The GPU is configured to render and draw content that needs to be displayed on a display screen. In some embodiments, the processor 2501 may further include an artificial intelligence (AI) processor. The AI processor is configured to process computing operations related to machine learning.

The memory 2502 may include one or more computer-readable storage media. The computer-readable storage medium may be non-transient. The memory 2502 may further include a high-speed random access memory and a non-volatile memory, for example, one or more magnetic disk storage devices or flash memory devices. In some embodiments, the non-transitory computer-readable storage medium in the memory 2502 is configured to store at least one instruction, and the at least one instruction is configured to be executed by the processor 2501 to implement the information display method provided in the method embodiments of this application.

In some embodiments, the terminal 2500 may exemplarily include: a peripheral device interface 2503 and at least one peripheral device. The processor 2501, the memory 2502, and the peripheral device interface 2503 may be connected by using a bus or a signal cable. Each peripheral device may be connected to the peripheral device interface 2503 by using a bus, a signal cable, or a circuit board. Specifically, the peripheral device includes: at least one of a radio frequency (RF) circuit 2504, a touch display screen 2505, a camera 2506, an audio circuit 2507, a positioning component 2508, and a power supply 2509.

The peripheral device interface 2503 may be configured to connect the at least one peripheral device related to input/output (I/O) to the processor 2501 and the memory 2502. In some embodiments, the processor 2501, the memory 2502, and the peripheral device interface 2503 are integrated on the same chip or circuit board. In some other embodiments, any one or two of the processor 2501, the memory 2502, and the peripheral device interface 2503 may be implemented on a separate chip or circuit board. This is not limited in this embodiment.

The RF circuit 2504 is configured to receive and transmit an RF signal, also referred to as an electromagnetic signal. The RF circuit 2504 communicates with a communication network and other communication devices by using the electromagnetic signal. The RF circuit 2504 converts an electrical signal into an electromagnetic signal for transmission, or converts a received electromagnetic signal into an electrical signal. Exemplarily, the RF circuit 2504 includes: an antenna system, an RF transceiver, one or more amplifiers, a tuner, an oscillator, a digital signal processor, a codec chip set, a subscriber identity module card, and the like. The RF circuit 2504 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 2504 may further include a circuit related to near field communication (NFC), which is not limited in this application.

The display screen 2505 is configured to display a user interface (UI). The UI may include a graph, text, an icon, a video, and any combination thereof. When the display screen 2505 is a touch display screen, the display screen 2505 is further capable of collecting a touch signal on or above a surface of the display screen 2505. The touch signal may be inputted to the processor 2501 as a control signal for processing. In this case, the display screen 2505 may be further configured to provide a virtual button and/or a virtual keyboard that are/is also referred to as a soft button and/or a soft keyboard. In some embodiments, there may be one display screen 2505, disposed on a front panel of the terminal 2500. In some other embodiments, there may be at least two display screens 2505, respectively disposed on different surfaces of the terminal 2500 or designed in a foldable shape. In still some other embodiments, the display screen 2505 may be a flexible display screen, disposed on a curved surface or a folded surface of the terminal 2500. Even, the display screen 2505 may be further set in a non-rectangular irregular pattern, namely, a special-shaped screen. The display screen 2505 may be prepared by using materials such as a liquid crystal display (LCD), an organic light-emitting diode (OLED), or the like.

The camera component 2506 is configured to capture images or videos. Exemplarily, the camera component 2506 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 2506 may further include a flashlight. The flashlight may be a monochrome temperature flashlight, or may be a double color temperature flashlight. The double color temperature flashlight refers to a combination of a warm flashlight and a cold flashlight, and may be used for light compensation at different color temperatures.

The audio circuit 2507 may include a microphone and a loudspeaker. The microphone is configured to collect sound waves of a user and an environment, and convert the sound waves into an electrical signal to input to the processor 2501 for processing, or input to the RF circuit 2504 for implementing voice communication. For the purpose of stereo collection or noise reduction, there may be a plurality of microphones, respectively disposed at different portions of the terminal 2500. The microphone may be further an array microphone or an omni-directional collection type microphone. The loudspeaker is configured to convert electrical signals from the processor 2501 or the RF circuit 2504 into sound waves. The loudspeaker may be a conventional thin-film loudspeaker or a piezoelectric ceramic loudspeaker. When the loudspeaker is the piezoelectric ceramic loudspeaker, the speaker can not only convert an electrical signal into sound waves audible to a human being, but also convert an electrical signal into sound waves inaudible to the human being for ranging and other purposes. In some embodiments, the audio circuit 2507 may also include an earphone jack.

The positioning component 2508 is configured to determine a current geographic location of the terminal 2500, to implement a navigation or a location based service (LBS). The positioning component 2508 may be a positioning component based on the Global Positioning System (GPS) of the United States, the BeiDou System of China, and the GALILEO System of Russia.

The power supply 2509 is configured to supply power to components in the terminal 2500. The power supply 2509 may be an alternating current, a direct current, a disposable battery, or a rechargeable battery. When the power supply 2509 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 2500 further includes one or more sensors 2510. The one or more sensors 2510 include, but are not limited to: an acceleration sensor 2511, a gyroscope sensor 2512, a pressure sensor 2513, a fingerprint sensor 2514, an optical sensor 2515, and a proximity sensor 2516. The above sensors in tandem with other components described herein may be used to serve as a control unit.

The acceleration sensor 2511 may detect a magnitude of acceleration on three coordinate axes of a coordinate system established by the terminal 2500. For example, the acceleration sensor 2511 may be configured to detect components of gravity acceleration on the three coordinate axes. The processor 2501 may control, according to a gravity acceleration signal collected by the acceleration sensor 2511, the touch display screen 2505 to display the UI in a landscape view or a portrait view. The acceleration sensor 2511 may be further configured to collect motion data of a game or a user.

The gyroscope sensor 2512 may detect a body direction and a rotation angle of the terminal 2500. The gyroscope sensor 2512 may cooperate with the acceleration sensor 2511 to collect a 3D action by the user on the terminal 2500. The processor 2501 may implement the following functions according to the data collected by the gyroscope sensor 2512: motion sensing (such as changing the UI according to a tilt operation of the user), image stabilization at shooting, game control, and inertial navigation.

The pressure sensor 2513 may be disposed at a side frame of the terminal 2500 and/or a lower layer of the touch display screen 2505. When the pressure sensor 2513 is disposed at the side frame of the terminal 2500, a holding signal of the user on the terminal 2500 may be detected. The processor 2501 performs left and right hand recognition or a quick operation according to the holding signal collected by the pressure sensor 2513. When the pressure sensor 2513 is disposed on the low layer of the touch display screen 2505, the processor 2501 controls, according to a pressure operation of the user on the touch display screen 2505, an operable control on the UI. The operable control includes at least one of a button control, a scroll bar control, an icon control, and a menu control.

The fingerprint sensor 2514 is configured to collect a user's fingerprint, and the processor 2501 identifies a user's identity according to the fingerprint collected by the fingerprint sensor 2514, or the fingerprint sensor 2514 identifies a user's identity according to the collected fingerprint. When the identity of the user is identified as a trusted identity, the processor 2501 authorizes the user to perform a related sensitive operation. The sensitive operation includes unlocking a screen, viewing encrypted information, downloading software, payment, changing settings, and the like. The fingerprint sensor 2514 may be disposed on a front surface, a back surface, or a side surface of the terminal 2500. When a physical button or a vendor logo is disposed on the terminal 2500, the fingerprint 2514 may be integrated with the physical button or the vendor logo.

The optical sensor 2515 is configured to collect ambient light intensity. In an embodiment, the processor 2501 may control the display luminance of the touch display screen 2505 according to the ambient light intensity collected by the optical sensor 2515. Specifically, when the ambient light intensity is relatively high, the display luminance of the touch display screen 2505 is increased. When the ambient light intensity is relatively low, the display luminance of the touch display screen 2505 is reduced. In another embodiment, the processor 2501 may further dynamically adjust a camera parameter of the camera component 2506 according to the ambient light intensity collected by the optical sensor 2515.

The proximity sensor 2516, also referred to as a distance sensor, is generally disposed on the front panel of the terminal 2500. The proximity sensor 2516 is configured to collect a distance between the user and the front surface of the terminal 2500. In an embodiment, when the proximity sensor 2516 detects that the distance between the user and the front surface of the terminal 2500 gradually becomes smaller, the touch display screen 2505 is controlled by the processor 2501 to switch from a screen-on state to a screen-off state. When the proximity sensor 2516 detects that the distance between the user and the front surface of the terminal 2500 gradually becomes larger, the touch display screen 2505 is controlled by the processor 2501 to switch from the screen-off state to the screen-on state.

A person skilled in the art may understand that the structure shown in FIG. 25 constitutes no limitation on the terminal 2500, and the terminal may include more or fewer components than those shown in the figure, or some components may be combined, or a different component deployment may be used.

In an exemplary embodiment, a computer-readable storage medium is further provided. The computer-readable storage medium is a non-volatile computer-readable storage medium. The computer-readable storage medium stores computer-readable instructions. The stored computer-readable instructions, when executed by a processing component, can implement the information display method provided in the foregoing embodiments of the present disclosure.

In an exemplary embodiment, a computer program product is further provided, the program product storing at least one instruction, at least one program, a code set, or an instruction set. The at least one instruction, the at least one program, the code set, or the instruction set is loaded and executed by a processor to implement the information display method performed by the terminal shown in the foregoing method embodiments.

"Plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the foregoing embodiments of this application are merely for description purpose but do not imply the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. An information display method, performed by a terminal, the method comprising:
   obtaining target information and an actual image in response to receiving an information display signal, the actual image being an image obtained by the terminal by photographing a real environment with a camera;
   generating an augmented reality (AR) image according to the target information and the actual image, comprising:
      recognizing at least one plane in a three-dimensional world corresponding to the actual image, and constructing an AR environment according to the at least one plane;
      changing the at least one plane of the AR environment according to changes of a position or an angle of the camera by using a dynamic tracking algorithm; and
      adding an AR element to a specified position in the AR environment to overlay the AR element on the actual image, so as to generate the AR image;
   displaying the AR image in a user interface, the AR element in the AR image being used for displaying the target information; and
   receiving a trigger signal on the user interface.

2. The method according to claim 1, wherein
   the target information comprises video information, and the AR element comprises at least one of a television element, a projection screen element, a display window element, or a billboard element.

3. The method according to claim 1, wherein
the target information comprises image-text information, and the AR element comprises at least one of a wall element, a bulletin board element, a picture frame element, a desk element, or an art gallery element.

4. The method according to claim 1, wherein generating the AR image according to the target information and the actual image further comprises:
loading an AR model; and
generating the AR element according to the target information and the AR model.

5. The method according to claim 4, wherein loading the AR model comprises:
loading a first AR model when a type of the target information is video information, the first AR model being any one of a television model, a projection screen model, a display window model, or a billboard model; and
loading a second AR model when the type of the target information is image-text information, the second AR model being any one of a wall model, a bulletin board model, a picture frame model, a desk model, and an art gallery model.

6. The method according to claim 4, wherein loading the AR model comprises:
sending information of hardware capability of the terminal to a server, the hardware capability of the terminal being a capability of computing resources applicable to the AR model to be loaded by the terminal; and
loading a third AR model, the third AR model comprising an AR model configured by the server according to the hardware capability of the terminal.

7. The method according to claim 4, wherein generating the AR element according to the target information and the AR model comprises:
obtaining a source file corresponding to the target information from a server;
converting a format of the source file into an AR format, the AR format being a format applicable to the AR environment; and
inputting the source file in the AR format to the AR model to generate the AR element.

8. The method according to claim 7, wherein converting the format of the source file into the AR format comprises:
determining a uniform resource locator (URL) of a picture from the source file in a Hyper Text Markup Language (HTML) format through regular expression matching when a type of the target information is image-text information; and
downloading the picture according to the URL of the picture and determining the downloaded picture as the source file in the AR format.

9. The method according to claim 7, wherein converting the format of the source file into the AR format comprises:
encapsulating the source file in a video stream format into a SKScene when a type of the target information is video information, and determining the SKScene as the source file in the AR format.

10. The method according to claim 4, wherein recognizing at least one plane in the three-dimensional world corresponding to the actual image, and constructing the AR environment according to the at least one plane comprises:
recognizing the at least one plane in the three-dimensional world corresponding to the actual image by using a plane detection algorithm;
integrating the at least one plane by using a plane integration algorithm to obtain a plane recognition result in the actual image; and
constructing a plane of the AR environment according to the plane recognition result.

11. The method according to claim 4, wherein the method further comprises:
controlling at least one of the position of the AR element or display of the target information in the AR element according to the trigger signal.

12. The method according to claim 11, wherein the method further comprises:
transforming first coordinates of the trigger signal on the user interface into second coordinates in the AR environment; and
controlling the position of the AR element according to the trigger signal when the second coordinates correspond to the AR element.

13. The method according to claim 1, wherein obtaining the target information and the actual image in response to receiving the information display signal comprises:
displaying an interface of information list, the interface of information list displaying a plurality of information control units, and each information control unit being configured for displaying one piece of information;
receiving a selection signal on a target information control unit in the plurality of information control units;
obtaining the target information corresponding to the target information control unit; and
obtaining the actual image by using the camera after receiving the selection signal.

14. The method according to claim 13, wherein obtaining the actual image by using the camera comprises:
determining whether access to the camera is permitted; and
enabling the camera and obtaining the actual image when the access to the camera is permitted.

15. A terminal device, comprising a processor and a memory, the memory storing computer-readable instructions, the computer-readable instructions, when executed by the processor, causing the terminal device to perform the method of claim 1.

16. A non-transitory computer-readable storage medium, storing computer-readable instructions, the computer-readable instructions, when executed by one or more processors of a terminal device, causing the terminal devices to perform the method of claim 1.

17. An information display apparatus comprising:
a user interface, configured to receive an information display signal;
a camera, configured to capture an actual image by photographing a real environment;
an image processor, configured to generate an AR image according to a target information and the actual image by:
recognizing at least one plane in a three-dimensional world corresponding to the actual image, and constructing an AR environment according to the at least one plane;
changing the at least one plane of the AR environment according to changes of a position or an angle of the camera by using a dynamic tracking algorithm; and
adding an AR element to a specified position in the AR environment to overlay the AR element on the actual image, so as to generate the AR image; and a display, configured to display the AR image, the AR element in the AR image being used for displaying the target information.

18. The information display apparatus according to claim 17, wherein the image processor is further configured to:
load an AR model according to a type of the target information and/or a hardware capability of the image processor; and
generate the AR element according to the target information and the AR model.

19. The information display apparatus according to claim 18, wherein the image processor is further configured to:
obtain a source file corresponding to the target information from a server;
convert a format of the source file into an AR format, the AR format being a format applicable to the AR environment; and
input the source file in the AR format to the AR model to generate the AR element.

* * * * *